United States Patent
Yasrebi

(10) Patent No.: US 12,118,111 B2
(45) Date of Patent: Oct. 15, 2024

(54) EDGE DATA PROCESSING UTILIZING PER-ENDPOINT SUBSCRIBER CONFIGURABLE DATA PROCESSING WORKLOADS

(71) Applicant: Dell Products L.P., Round Rock, TX (US)

(72) Inventor: Mehrad Yasrebi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 17/850,130

(22) Filed: Jun. 27, 2022

(65) Prior Publication Data

US 2023/0418963 A1    Dec. 28, 2023

(51) Int. Cl.
*G06F 21/62* (2013.01)
*G06F 9/48* (2006.01)

(52) U.S. Cl.
CPC ........ *G06F 21/6218* (2013.01); *G06F 9/4881* (2013.01)

(58) Field of Classification Search
CPC .......................... G06F 21/6218; G06F 9/4881
See application file for complete search history.

(56) References Cited

U.S. PATENT DOCUMENTS

| | | | | |
|---|---|---|---|---|
| 10,924,334 | B1 * | 2/2021 | Kumar | H04L 67/55 |
| 2017/0111331 | A1 * | 4/2017 | Auradkar | H04L 63/0428 |
| 2018/0218060 | A1 * | 8/2018 | Guron | G06F 16/283 |
| 2019/0268310 | A1 * | 8/2019 | Guberman | H04L 67/10 |
| 2020/0356415 | A1 * | 11/2020 | Goli | G06N 20/00 |
| 2021/0144517 | A1 * | 5/2021 | Guim Bernat | H04L 41/0869 |
| 2021/0241926 | A1 * | 8/2021 | Chor | H04W 4/70 |

OTHER PUBLICATIONS

The PostgreSQL Global Development Group, "PostgreSQL: The World's Most Advanced Open Source Relational Database," https://www.postgresql.org/, Accessed Jun. 27, 2022, 4 pages.

(Continued)

*Primary Examiner* — Kambiz Zand
*Assistant Examiner* — Afaq Ali
(74) *Attorney, Agent, or Firm* — Ryan, Mason & Lewis, LLP

(57) ABSTRACT

An apparatus comprises a processing device configured to obtain, at a data center, source data generated by edge devices associated with the data center and to determine, for each endpoint subscriber of the source data, an associated per-endpoint data processing workflow. The processing device is also configured to select, based at least in part on authorization parameters in a given per-endpoint data processing workflow associated with a given endpoint subscriber, at least a portion of the source data that is to be provided to the given endpoint subscriber. The processing device is further configured to apply, based at least in part on transformation parameters in the given per-endpoint data processing workflow associated with the given endpoint subscriber, data transformations to the portion of the source data to generate transformed data and to provide, from the data center to the given endpoint subscriber, the transformed data.

20 Claims, 25 Drawing Sheets

(56) References Cited

OTHER PUBLICATIONS

C. Browne, "Slony-I 2.2.10 Documentation," https://www.slony.info/adminguide/2.2/doc/adminguide/slony.pdf, Dec. 4, 2020, 307 pages.
Slony Development Group, "Slony-I: Enterprise-level Replication System," https://www.slony.info/, Accessed Jun. 27, 2022, 4 pages.
S. Mukherjee, "The Battle Between NoSQL Databases and RDBMS," International Journal of Innovative Research in Science, Engineering and Technology, May 2019, 24 pages.
M. Liu et al., "Review of Digital Twin About Concepts, Technologies, and Industrial Applications," Journal of Manufacturing Systems, vol. 58, Part B, Jan. 2021, 16 pages.
L. Marcotte, "Database Replication with Slony-I," Linux Journal, https://www.linuxjournal.com/article/7834, Apr. 28, 2005, 14 pages.
A. Ziebinski et al., "Review of Advanced Driver Assistance Systems (ADAS)" AIP Conference Proceedings, Nov. 2017, 5 pages.
J. S. Queiroz et al., "AMANDA: A Middleware for Automatic Migration between Different Database Paradigms," Applied Sciences, vol. 12, No. 6106, Jun. 16, 2022, 20 pages.
Y. Li et al., "A Performance Comparison of SQL and NoSQL Databases," Conference on Communications, Computers, and Signal Processing, Aug. 1, 2013, pp. 15-19.

\* cited by examiner

| DATA FORM | TECHNOLOGIES | PORTION |
|---|---|---|
| TABLES | SQL | FULL TABLES, SHARDED DATA (SUB-TABLES) |
| TABLES | NOSQL | |
| FILES | COPY, XFER | FULL, PORTIONS |
| ... | ... | ... |

FIG. 11

```
ENDPOINT=<name>
    DESTINATION_ADDRESS=XX.XX....           # May be from the DIF orchestration
    DESTINATION_PORT=XXX                     # May be from DIF orchestration
    DATA_SHARE_SCHEDULE = {...}
    DATA_DESTINATION_INFO                    # Depends on the type of data
    {
        DATA_TYPE = [image_file, video_file, SQL table, NoSQL_Table, text file, blob, ...]
        DATA_TYPE_IMPLEMENTATION=[PostgreSQL, MySQL,Yugabyte, ....]
        ACCESS_CREDENTIALS=]{user id, password}
        DATA_TYPE_IMPLEMENTATION_VERSION=
        DATA_SOURCE_ID = [camera x, database y & table z, ...]
        DATA_EXTRACTION_STATEMENT=["select...", <filename>,...]
    }
```

FIG. 12A

```
DATA_SOURCE
{   TYPE=
    VERSION=[X.Y.Z]
}
DATA_PROCESSING_RESOURCES
{   DPU_ID=[NONE,N]
    DPU_TRANSFORMATION_ID=[FFT, ...]
}
COMPRESSION_TYPE=[NONE, ZIP, ...]
ENCRYPTION_SPECIFIERS=[NONE, {...}]

TRANSFORM_1={Input, parameters, output}
TRANSFORM_2={Input, parameters, output}
TRANSFORM_n={Input, parameters, output}
...
```

FIG. 12B

```
############## Primitive directives ###############
# A <STRING> can be NULL. We can also use <NON_NULL_STRING> in dictionary, where needed.

TEMPLATE_NAME=<STRING>
TEMPLATE_VERSION_MAJOR=<STRING>
TEMPLATE_VERSION_MINOR=<STRING>

COMMA_SEPARATED_STRINGS=<STRING> [,<STRING>]*
COMMAND_STRING=<STRING> # may include more than one command (e.g., |, ;, && ).

SCHEDULE=<cron format>
IPV4=<DIGITS>.<DIGITS>.<DIGITS>.<DIGITS>
IPV6=<ALPHA_STRING>:<ALPHA_STRING>:[<ALPHA_STRING>]:[<ALPHA_STRING>]:[<ALPHA
_STRING>]:[<ALPHA_STRING>]:<ALPHA_STRING>
HOST=<IPV4> | <IPV6> | <STRING>

ACQUIRE=<COMMAND_STRING>
NOTIFY=<COMMAND_STRING>

USERID=<STRING>
PASSWORD=<STRING>

COMPRESSION_CMD_STRING=<STRING>
ENCRYPTION_CMD_STRING=<STRING>

CREATE_STORAGE_SPACE_AND_RIGHTS=<STRING>
# This is a script that can choose to skip creation, if it exists in a prior orchestration.
# Each endpoint can have a unique or shared (e.g., for the same customer) space.

TRANSFORMS=<COMMAND_STRING>
# A TRANSFORM string can specify:
#    Any single transform is command line transformation. Examples, include, but are not limited to,
#    transforms that specify:
#    - source(s) (e.g., cameras, drones, ...) and specific AI/ML models (and parameters), where
#      different models can be specified by customer(s), who may even provide their own binaries.
#    - partitioning of data (e.g., based on coordinates, color, ...).
#    - compression(s).
#    - encryption(s).
#    - etc.

SCP=scp [options] <DESTINATION_USERID>@<DESTINATION_IP>::<STRING>/<STRING>
TRANSFER=<SCP>

# Pipeline specification is a specific sequence
PIPELINE=[<SCHEDULE>] [<ACQUIRE>] [<TRANSFORMS>] [<TRANSFER>] [<NOTIFY>]
```

```
GENERIC PIPELINE TEMPLATE 1 (customized per endpoint) ##
TEMPLATE_NAME="gen_pipe_1"
<CREATE_STORAGE_SPACE_AND_RIGHTS>
<PIPELINE>
<TRANSFER>
<NOTIFY>
```

1310

```
GENERIC AI/ML PIPELINE TEMPLATE (customized per endpoint) ##
TEMPLATE_NAME="ai_ml_gen_pipe_1"
AI_ML_DATA_SOURCE=<STRING>
AI_ML_SEGMENTED_SEARCH_STRING=<STRING>
<CREATE_STORAGE_SPACE_AND_RIGHTS>
<PIPELINE>
# Pipeline could include a generic script that would use
# ${AI_ML_SEGMENTED_SEARCH_STRING=<STRING>} to look for target(s) of interest in the
# analyzed GPU-semantically-analyzed input from source(s) {AI_ML_DATA_SOURCE}.
# A generic PIPELINE may be created for this purpose based on installed/certified equipment,
# whereby parameters could be:
<TRANSFER>
<NOTIFY>
```

1315

```
GENERIC ASYNCHRONOUS SQL REPLICATION TEMPLATE 1 (customized per endpoint) ##
TEMPLATE_NAME="gen_sql_replica_1"
CLUSTER_NAME=<STRING>
SLAVE_HOST=<STRING>
REPLICATION_USER=<STRING>
REPLICATION_PASSWORD=<STRING>
SHARED_TABLE_LIST=<COMMA_SEPARATED_STRINGS>
# Notes:
# Tables can be created granularly to allow for desired data partitioning (e.g., need to know basis).
# A sharded table can be even more granular than a larger table.
# If/where the replication facility allows, views that restrict customized access may also be possible.
# REPLICATION_PASSWORD or other directives may or may not be needed, depending on the
# replication engine.
```

```
GENERIC ASYNCHRONOUS SQL REPLICATION TEMPLATE 2 (customized per endpoint) ##
TEMPLATE_NAME="gen_sql_extraction_1"
<CREATE_STORAGE_SPACE_AND_RIGHTS>
ACQUIRE="psql SELECT ... > file1"
# psql is just an example for PostgreSQL; other databases can have different native invocations.
<PIPELINE>  # <ACQUIRE> would be null here
<TRANSFER>
<NOTIFY>
```

1325

```
GENERIC EVENT/TRIGGER SQL DATA TRANSFER TEMPLATE (customized per endpoint) ##
TEMPLATE_NAME="gen_sql_3"
<CREATE_STORAGE_SPACE_AND_RIGHTS>
TRIGGER_FUNCTION=<STRING>
ACQUIRE="psql CREATE TRIGGER <TRIGGER_FUNCTION"
# psql is just an example for PostgreSQL; other databases can have different native invocations.
# Trigger function would write a file (e.g., file1) that can be used in pipeline.
# Note that ongoing AI/ML engines can also store (e.g., semantic) data into a Database and rely on
an UPDATE trigger of that database for processing.

<PIPELINE>  # <SCHEDULE> and <ACQUIRE> could be null here. Trigger FUNCTION could
include
<TRANSFER>
<NOTIFY>
```

FIG. 13C

```
// Variables
// Schedule
SCHEDULE=SYM_SCHEDULE
// Input
// Action(s)
// Output
```

```
    SYM_SCHEDULE=CRON,"30 * * * *"
```

```
INPUT=SYM_CAMERA-I-OUTPUT-DIR
ACTION="/usr/bin/my_favorite_converter -i SYM_CAMERA-I-OUTPUT_DIR \
        -o SYM_CAMERA-I-OUTPUT-PNG_DIR"
OUTPUT = SYM_CAMERA-I-OUTPUT-PNG_DIR
```

```
                                                    1415
                                                     /
┌─────────────────────────────────────────────────────────────┐
│ OUTPUT=SYM_CAMERA-I-OUTPUT_DIR="/home/camera-i-output/jpeg" │
│ // This example may set the values of                       │
│ // OUTPUT and SYM_CAMERA-I-OUTPUT-DIR                       │
│ // to "/home/camera-i-output/jpeg".                         │
│ INPUT=SYM_CAMERA-I-OUTPUT_DIR                               │
│ SYM_CAMERA-I-OUTPUT-PNG_DIR = "/home/edge_device_i/png"     │
└─────────────────────────────────────────────────────────────┘
```

FIG. 14D

```
                                                    1420
                                                     /
┌─────────────────────────────────────────────────────────────┐
│ // input=sym_camera_i_output_png                            │
│                                                             │
│ /usr/bin/search_and_label_image_sequence_with_sdk_p    \    │
│ input_dir  = sym_camera_i_output_png                   \    │
│ output_dir = sym_camera_i_scene_analyzed_result_dir    \    │
│ objects    = sym_list_of_objects_of_interest           \    │
│ dpu_index  = sym_dpu_index_k                           \    │
│ models     = sym_n_models                                   │
│ sym_core_2_endpoint_i_info = {<ip address>, <port>, ...}    │
│ // can transform this output (e.g., ACTION=compress)        │
│                                                             │
│ ACTION=/usr/bin/notify_core_customer_of_result_and_send_data \ │
│ input_dir = sym_camera_i_scene_analyzed_result_dir     \    │
│ core_2    = sym_core_2_endpoint_i_info                      │
└─────────────────────────────────────────────────────────────┘
```

FIG. 14E

```
                                                    1425
                                                     /
┌─────────────────────────────────────────────────────────────┐
│ SYM_CAMERA_I_SCENE_ANALYZED_RESULT_DIR =\                   │
│         "/home/core2/endpoint_i/analysis_dir"               │
│                                                             │
│ SYM_LIST_OF_OBJECTS_OF_INTEREST = "car,person"              │
│ SYM_DPU_INDEX_K = 1                                         │
│ SYM_N_MODELS = "pretrained_city19"                          │
│ SYM_CORE_2_ENDPOINT_I_INFO = "destination_ip=192.168.10.117,│
│ destination_userid=fred destination_dir=/home/edge3_results"│
└─────────────────────────────────────────────────────────────┘
```

FIG. 14F

EDGE DATA PROCESSING UTILIZING PER-ENDPOINT SUBSCRIBER CONFIGURABLE DATA PROCESSING WORKLOADS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system.

However, significant challenges can arise in the management of services in cloud-based information processing systems. Similar challenges arise in other types of information processing systems.

SUMMARY

Illustrative embodiments of the present disclosure provide techniques for edge data processing utilizing per-endpoint subscriber configurable data processing workflows.

In one embodiment, an apparatus comprises at least one processing device comprising a processor coupled to a memory. The at least one processing device is configured to perform the steps of obtaining, at a data center, source data generated by one or more edge devices associated with the data center and determining, for each of one or more endpoint subscribers of the source data, an associated per-endpoint data processing workflow for the source data generated by the one or more edge devices associated with the data center. The at least one processing device is also configured to perform the step of selecting, based at least in part on one or more authorization parameters in a given per-endpoint data processing workflow associated with a given one of the one or more endpoint subscribers, at least a portion of the source data generated by the one or more edge devices associated with the data center that is to be provided to the given endpoint subscriber. The at least one processing device is further configured to perform the steps of applying, based at least in part on one or more transformation parameters in the given per-endpoint data processing workflow associated with the given endpoint subscriber, one or more data transformations to the portion of the source data generated by the one or more edge devices associated with the data center that is to be provided to the given endpoint subscriber to generate transformed data for the given endpoint subscriber and providing, from the data center to the given endpoint subscriber, the transformed data.

These and other illustrative embodiments include, without limitation, methods, apparatus, networks, systems and processor-readable storage media.

BRIEF DESCRIPTION OF THE DRAWINGS

FIG. 11 shows a table of various edge data types and technologies that may be used for edge data orchestration in an illustrative embodiment.

FIGS. 12A and 12B show pseudocode for infrastructure-as-a-service data enablement and data processing orchestration in an illustrative embodiment.

FIGS. 13A-13C show pseudocode for data enablement orchestration including primitive directives and sample pipeline templates generated using the primitive directives in an illustrative embodiment.

FIGS. 14A-14F show pseudocode of examples of templates used in generating configurable workflow pipelines in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
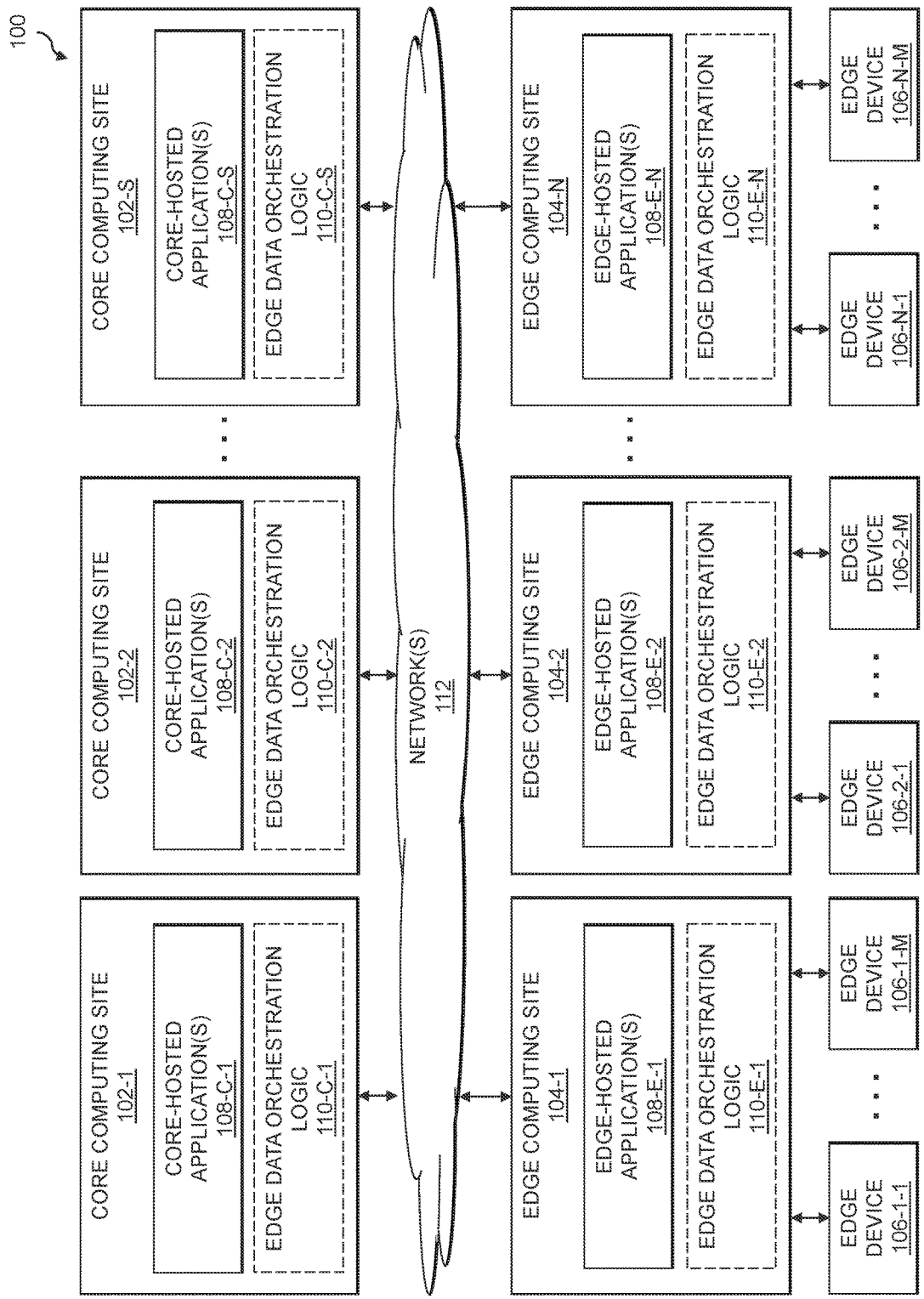
FIG. 1 is a block diagram of an information processing system configured for edge data processing utilizing per-endpoint subscriber configurable data processing workflows in an illustrative embodiment.

FIG. 1 shows an information processing system 100 configured in accordance with an illustrative embodiment. The information processing system 100 is assumed to be built on at least one processing platform and provides functionality for edge data processing among a set of core computing sites 102-1, 102-2, ... 102-S (collectively, core computing sites 102) and a set of edge computing sites 104-1, 104-2, ... 104-N (collectively, edge computing sites 104, also referred to as edge computing nodes or edge data centers 104). The core computing sites 102, also referred to as core data centers 102, are assumed to comprise a plurality of core devices or core nodes (not shown in FIG. 1) that run sets of core-hosted applications 108-C-1, 108-C-2, ... 108-C-S (collectively, core-hosted applications 108-C). In some embodiments, the core computing sites 102 comprise or are part of one or more cloud computing platforms, and may include one or more clouds on which the core-hosted applications 108-C run. In such embodiments, the core-hosted applications 108-C may alternatively be referred to as cloud-hosted applications 108-C. Each of the edge computing sites 104 is assumed to comprise compute infrastructure or edge assets (not shown in FIG. 1) that run sets of edge-hosted applications 108-E-1, 108-E-2, ... 108-E-N (collectively, edge-hosted applications 108-E). The core-hosted applications 108-C and edge-hosted applications 108-E are collectively referred to as applications 108. As used herein, the term "application" is intended to be broadly construed to include applications, microservices, and other types of services.

The information processing system 100 includes a plurality of edge devices that are coupled to each of the edge computing sites 104. A set of edge devices 106-1-1, ... 106-1-M (collectively, edge devices 106-1) are coupled to edge computing site 104-1, a set of edge devices 106-2-1, ... 106-2-M (collectively, edge devices 106-2) are coupled to edge computing site 104-2, and a set of edge devices 106-N-1, ... 106-N-M (collectively, edge devices 106-N) are coupled to edge computing site 104-N. The edge devices 106-1, 106-2, ... 106-N are collectively referred to as edge devices 106. It should be appreciated that the particular number "M" of edge devices 106 that are connected to each of the edge computing sites 104 may be different. In other words, the number M of edge devices 106-1 coupled to the edge computing site 104-1 may be the same as or different than the number M of edge devices 106-2 coupled to the edge computing site 104-2. Further, a particular one of the edge devices 106 may be connected or coupled to only a single one of the edge computing sites 104 at any given time, or may be coupled to multiple ones of the edge computing sites 104 at any given time, or may be connected to different ones of the edge computing sites 104 at different times.

The edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

The edge devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

As shown in FIG. 1, the edge computing sites 104 are connected to the core computing sites 102 via one or more networks 112. Although not explicitly shown, the edge devices 106 may be coupled to the edge computing sites 104 via the networks 112. The networks 112 coupling the core computing sites 102, the edge computing sites 104 and the edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the edge devices 106 to the edge computing sites 104, while a second type of network (e.g., a private network) couples the edge computing sites 104 to the core computing sites 102. Various other examples are possible.

In some embodiments, one or more of the core computing sites 102 and one or more of the edge computing sites 104 collectively provide at least a portion of an information technology (IT) infrastructure operated by an enterprise, where the edge devices 106 are operated by users of the enterprise. The IT infrastructure comprising such core computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of the core computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operated the one or more core computing sites 102.

Although not explicitly shown in FIG. 1, one or more input-output devices such as keyboards, displays or other types of input-output devices may be used to support one or more user interfaces to the core computing sites 102, the edge computing sites 104 and the edge devices 106, as well as to support communication between the core computing sites 102, the edge computing sites 104, the edge devices 106, and other related systems and devices not explicitly shown.

As noted above, the core computing sites 102 host core-hosted applications 108-C and the edge computing sites 104 host edge-hosted applications 108-E, where the core-hosted applications 108-C and the edge-hosted applications 108-E are collectively referred to as applications 108. The edge devices 106 may exchange information with the applications 108. For example, the edge devices 106 or edge-hosted applications 108-E may send information to the core-hosted applications 108-C. The edge devices 106 or edge-hosted applications 108-E may also receive information (e.g., such as instructions) from the core-hosted applications 108-C. Using the technical solutions described herein, the edge computing sites 104 are configured to process and publish customized selected, authorized and processed information to the core-hosted applications 108-C as described in further detail elsewhere herein.

It should be noted that, in some embodiments, requests and responses or other information may be routed through multiple edge computing sites. While FIG. 1 shows an embodiment where each edge computing site 104 is connected directly to the core computing sites 102 via the networks 112, this is not a requirement. In other embodiments, one or more of the edge computing sites 104 may be connected to one or more of the core computing sites 102 via one or more other ones of the edge computing sites 104 (e.g., the edge computing sites 104 may be arranged in a hierarchy with multiple levels, possibly including one or more edge data centers that couple the edge computing sites 104 with the core computing sites 102).

Different ones of the applications 108 may have different required performance or other characteristics. As a result, it may be more advantageous for certain ones of the applications 108 to be hosted at one or more of the core computing sites 102 or one or more of the edge computing sites 104, based on the required performance, metrics or other characteristics of the applications 108. Further, the required performance, metrics or other characteristics of the applications 108 may change over time, such that a given application hosted on one of the edge computing sites 104 at a first time may be better suited for hosting by one of the core computing sites 102 at a second time, or vice versa. The edge computing sites 104 and the core computing sites 102 may implement application tiering logic that provides for dynamic allocation of processing locations for the applications 108 at the core computing sites 102 and the edge computing sites 104.

In some embodiments, data that is produced at different ones of the edge devices 106 is to be consumed by different endpoints. The endpoints may be other ones of the edge devices 106, one or more of the edge computing sites 104, one or more of the core computing sites 102, or one or more other processing devices that are coupled to the edge computing sites 104 (e.g., Internet-connected client devices coupled to the networks 112, not shown in FIG. 1). In some cases, the same data produced by a given one of the edge devices 106 is to be consumed by multiple different endpoints. Such data may be processed or transformed at a given one of the edge computing sites 104 to which the given edge device 106 is coupled prior to being sent to the multiple different endpoints. Such processing or transformation of data, which may be done on a per-endpoint basis, is facilitated by edge data orchestration logic 110-E-1, 110-E-2, . . . 110-E-N (collectively, edge data orchestration logic 110-E) at the edge computing sites 104, and by edge data orchestration logic 110-C-1, 110-C-2, . . . 110-C-S (collectively, edge data orchestration logic 110-C) at the core computing sites 102. The edge data orchestration logic 110-C and edge data orchestration logic 110-E (collectively, edge data orchestration logic 110), for example, may be used to create a workflow data infrastructure language (DIL) that is used in configuring workflows for processing and transforming data from the edge devices 106 that is to be provided to various endpoints. The edge data orchestration logic 110-E at the edge computing sites 104 dynamically instantiate the configurable workflows using their edge assets in order to perform the processing or transformation of edge data from the edge devices 106 prior to sending the processed or transformed data to various endpoints.

In some embodiments, edge data from the edge devices 106 may be stored in a database or other data store (not shown), either locally at the edge computing sites 104 and/or in processed or transformed format at different endpoints (e.g., the core computing sites 102, the edge computing sites 104, other ones of the edge devices 106, etc.). The database or other data store may be implemented using one or more of storage systems that are part of or otherwise associated with one or more of the core computing sites 102, the edge computing sites 104, and the edge devices 106. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the core computing sites 102 and the edge computing sites 104 in this embodiment, the edge data orchestration logic 110 in other embodiments can be implemented at least in part externally to the core computing sites 102 and/or the edge computing sites 104, for example, as a stand-alone server, set of servers or other type of system coupled via the one or more networks 112 to one or more of the core computing sites 102 and/or the edge computing sites 104. In some embodiments, the edge data orchestration logic 110 may be implemented at least in part within one or more of the edge devices 106. In still other embodiments, the edge data orchestration logic 110 may be implemented at a subset of the core computing sites 102 and the edge computing sites 104, rather than having instances implemented at each of the core computing sites 102 and each of the edge computing sites 104. Various other examples are possible.

The core computing sites 102 and the edge computing sites 104 in the FIG. 1 embodiment are assumed to be implemented using at least one processing device. Each such processing device generally comprises at least one processor and an associated memory, and implements at least a portion of the functionality of the edge data orchestration logic 110.

It is to be appreciated that the particular arrangement of the core computing sites 102, the edge computing sites 104, the edge devices 106, the applications 108, the edge data orchestration logic 110 and the networks 112 illustrated in the FIG. 1 embodiment is presented by way of example only, and alternative arrangements can be used in other embodiments. As discussed above, for example, the edge data orchestration logic 110 may be implemented external to one or both of the core computing sites 102 and the edge computing sites 104. At least portions of the edge data orchestration logic 110 may be implemented at least in part in the form of software that is stored in memory and executed by a processor.

It is to be understood that the particular set of elements shown in FIG. 1 for edge data processing utilizing per-endpoint subscriber configurable data processing workflows is presented by way of illustrative example only, and in other embodiments additional or alternative elements may be used. Thus, another embodiment may include additional or alternative systems, devices and other network entities, as well as different arrangements of modules and other components.

The core computing sites 102, the edge computing sites 104, the edge devices 106 and other portions of the system 100, as described above and in further detail below, may be part of cloud infrastructure.

The core computing sites 102, the edge computing sites 104, the edge devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The core computing sites 102, the edge computing sites 104, and the edge devices 106, or components thereof, may be implemented on respective distinct processing platforms, although numerous other arrangements are possible. For example, in some embodiments at least portions of the edge devices 106 and the edge computing sites 104 may be implemented on the same processing platform. One or more of the edge devices 106 can therefore be implemented at least in part within at least one processing platform that implements at least a portion of the edge computing sites 104 and/or the core computing sites 102. In other embodiments, one or more of the edge devices 106 may be separated from but coupled to one or more of the edge computing sites 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the core computing sites 102, the edge computing sites 104 and the edge devices 106, or portions or components thereof, to reside in different data centers. Numerous other distributed implementations are possible.

Additional examples of processing platforms utilized to implement the core computing sites 102, the edge computing sites 104 and the edge devices 106 and other components of the system 100 in illustrative embodiments will be described in more detail below in conjunction with FIGS. 18 and 19.

It is to be appreciated that these and other features of illustrative embodiments are presented by way of example only, and should not be construed as limiting in any way.

An exemplary process for edge data processing utilizing per-endpoint subscriber configurable data processing workflows will now be described in more detail with reference to the flow diagram of FIG. 2. It is to be understood that this particular process is only an example, and that additional or alternative processes for edge data processing utilizing per-endpoint subscriber configurable data processing workflows may be used in other embodiments. Furthermore, it is to be understood that this example process may be applied to groups of endpoints in other embodiments.

In this embodiment, the process includes steps 200 through 208. These steps are assumed to be performed by the edge computing sites 104 and possibly the core computing sites 102 utilizing the edge data orchestration logic 110. The process begins with step 200, obtaining, at a data center (e.g., one of the edge computing sites 104 or one of the core computing sites 102), source data generated by one or more edge devices (e.g., edge devices 106) associated with the edge data center. In step 202, a per-endpoint data processing workflow is generated for each of one or more endpoint subscribers of the source data generated by the one or more edge devices associated with the data center. A given per-endpoint data processing workflow associated with a given one of the one or more endpoint subscribers specifies one or more authorization parameters and one or more transformation parameters. The given endpoint subscriber may comprise one or more other edge devices associated with the data center. The given endpoint subscriber may alternatively comprise a core data center (e.g., one of the core computing sites 102) coupled to the data center (e.g., where the data center is an edge data center or one of the edge computing sites 104). The edge data center may be operated by a first entity, and the core data center coupled to the edge data center may be operated by a second entity different than the first entity. A first one of the one or more endpoint subscribers and a second one of the one or more endpoint subscribers may be associated with a same entity, the first endpoint subscriber having a first per-endpoint data processing workflow and the second endpoint subscriber having a second per-endpoint data processing workflow different than the first per-endpoint data processing workflow. The given per-endpoint data processing workflow may comprise one or more data files written in a data infrastructure language of an entity operating the data center.

In some embodiments, the given per-endpoint data processing workflow comprises a configurable workflow pipeline defining: one or more scheduling parameters specifying a schedule for executing a pipeline for providing information related to or a portion of the source data generated by the one or more edge devices associated with the data center to the given endpoint subscriber; one or more acquisition parameters for obtaining the portion of the source data generated by the one or more edge devices associated with the data center; the one or more authorization parameters; the one or more data store parameters; the one or more transformation parameters; and one or more data transfer parameters specifying destination address information and access credentials for the given endpoint subscriber. The given per-endpoint data processing workflow may comprise an instantiation of one or more configurable workflow templates, a given one of the configurable workflow templates specifying one or more commands for creating storage space and access rights for the given endpoint subscriber to access the transformed data and the configurable workflow pipeline. Generating the given per-endpoint data processing workflow for the given endpoint subscriber may comprise generating a configurable workflow pipeline using a subset of a plurality of pipeline processing elements, the plurality of pipeline processing elements comprising one or more device data ingestion elements, one or more transformation elements, one or more data processing unit elements, and one or more data store elements.

Figure 2:
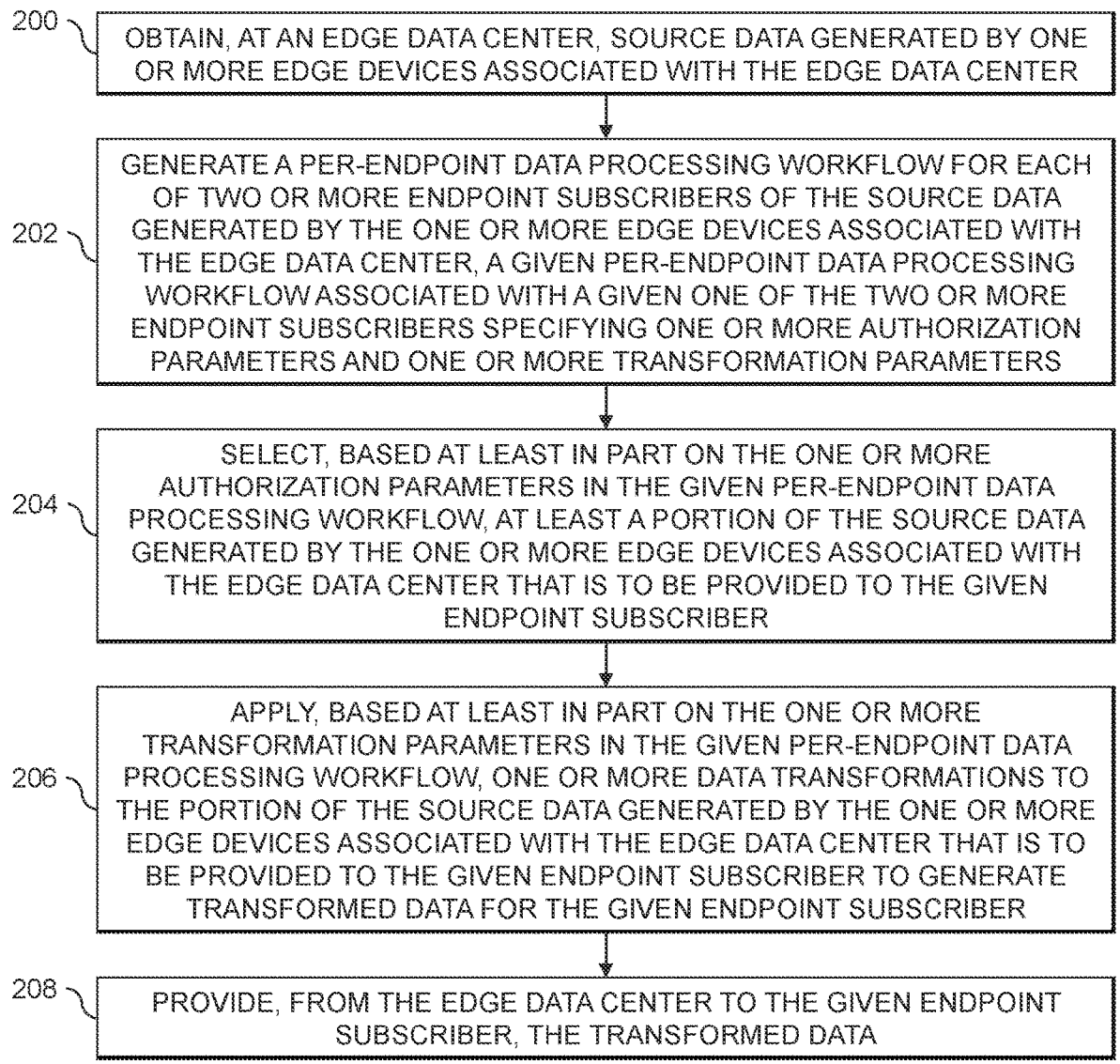
FIG. 2 is a flow diagram of an exemplary process for edge data processing utilizing per-endpoint subscriber configurable data processing workflows in an illustrative embodiment.

The FIG. 2 process continues with step 204, selecting, based at least in part on any authorization parameters in the given per-endpoint data processing workflow, at least a portion of the source data generated by the one or more edge devices associated with the data center that is to be provided to the given endpoint subscriber. It should be noted that, in some cases, no authorization parameters may be provided in the given per-endpoint data processing workflow (e.g., in cases where no explicit authorization parameters are needed). The authorization parameters, in some cases, include specification of authorized endpoints. There may not be a need to specify any additional authorization parameters (e.g., such as in a private network). In some embodiments, the authorization parameters specify, for each of one or more data elements in the source data generated by the one or more edge devices associated with the data center, one or more types of information permitted to be shared with the given endpoint subscriber. In step 206, one or more data transformations are applied to the portion of the source data generated by the one or more edge devices associated with the data center that is to be provided to the given endpoint subscriber to generate transformed data for the given endpoint subscriber, where the one or more data transformations are based at least in part on the one or more transformation parameters in the given per-endpoint data processing workflow. The transformed data is provided from the data center to the given endpoint subscriber in step 208. The one or more transformation parameters may specify data processing to be applied to the portion of the source data generated by the one or more edge devices associated with the data center using one or more hardware accelerators of the data center. The one or more hardware accelerators of the data center may comprise one or more graphics processing units. The one or more transformation parameters may also or alternatively specify one or more security measures to be applied to the portion of the source data generated by the one or more edge devices associated with the data center. The one or more security measures may comprise at least one of encryption, compression, aggregation and anonymization.

Illustrative embodiments provide technical solutions for a distributed and hybrid intelligent edge data enablement ecosystem, facilitating faster and more efficient custom data ingestion from edge devices to various endpoint destinations (e.g., core data centers, clouds, customer devices, etc.). There is a need for easy (e.g., minimal effort) and rapid solutions for heterogeneous data publishing from data centers for endpoints (e.g., customers, end-users or other subscribers) in distributed environments, such that edge data can be monetized or otherwise leveraged. A "data center," as used herein, can be any arrangement of one or more computers or other processing devices that processes data associated with one or more edge devices. In some embodiments, the data center is an edge data center where edge data originates from. It should be appreciated that an edge data center need not be co-located with any of the edge devices, and in some cases could be centrally located. An edge data center may be operated by an enterprise or its customers, and in some cases may host one or more customers (e.g., tenants) that can implement edge data orchestration engines as described herein. A heterogeneous data center, as used herein, refers to a data center that can interconnect with other data centers, and which may use different data storage and other technologies that may force consideration of data enablement for edge data orchestration. A data center may consist of one more data centers, which may be in the same or near geographical locations. Therefore, an edge data center and a core data center may be the same or different tenants and/or data centers in the same and/or different locations. A data center may use similar or different kinds of apparatus (e.g., computing units, storage units, networking units, etc.).

The technical solutions described herein enable an edge-core intelligent data ecosystem for efficient deployment of custom application solutions for customers, end-users or other subscribers with various (e.g., heterogeneous) application data types (e.g., existing and emerging). Such diverse applications include, but are not limited to, big data, artificial intelligence (AI) and machine learning (ML), digital twins (DTs), advanced driver assist systems (ADAS), telemetry, security, governance, IoT, etc. A data enablement customizable platform is needed to encourage, facilitate and differentiate quick adoption and use of an enterprise's ecosystems (e.g., including edge and core data centers operated by the enterprise), and to support diverse existing and emerging data and data subscriber needs. The technical solutions described herein provide an intelligent distributed, hybrid data enablement ecosystem (e.g., edge data orchestration engines) for diverse data subscribers. An enterprise providing edge data orchestration engines can provide a competitive differentiated data solution, and is a good candidate for monetization.

The technical solutions described herein enable effortless end-user applications via heterogeneous edge data centers associated with data publishers, where the edge data centers implement edge data orchestration engines. Edge devices (e.g., which may be on-premises or co-located with infrastructure operated by an enterprise providing various edge assets including an edge data orchestration engine) that publish data (e.g., for subscribers at other data centers, which may be edge data centers, core data centers, cloud and other computing platforms, etc.) need to support effortless subscription and ingest to meet various data subscriber needs. A competitive hybrid infrastructure ecosystem should include robust edge data enablement services for streamlined application deployments with diverse target technologies and implementations associated with different endpoints (e.g., end-users, customers or other subscribers). The edge data enablement services can provide allocated (e.g., of interest, subscribed, need-to-know) data shards (e.g., portions of the edge data). The edge data enablement services can further provide custom transformations of edge data for easy and preferred ingestion at subscriber data center tenant instances (e.g., which may be part of a core or cloud data center). The edge data enablement services can also leverage an enterprise's edge data center data processing units (DPUs) to prepare the edge data. DPUs may be known as or be associated with graphic processing units (GPUs) or other computational acceleration units. Such edge data center DPUs or other assets can be used with new software or logic that addresses data transformations, analyses, and the diversity and heterogeneity challenges described herein. A DPU may be used to for speeding up computations, which may also be carried out by another processing unit such as a central processing unit (CPU). In some embodiments, combinations of CPU, DPU and other types of processing units may be used though in the description below DPU is used for clarity of illustration. Edge data enablement services can also be offered independently, in the form of a data subscription "as a service" technology by an enterprise (e.g., via its edge data center, or third-party data center providers or end-users).

Data subscribers may issue diverse requests for data that originates at edge devices, and there is a need for technical solutions that use an enterprise's edge data center assets to resolve such requests. The data subscribers may have diverse data needs. Consider the following different requests for data originating at edge devices: alerts (e.g., with ML and AI processing) with video, images, still image sequences, locations and analysis (e.g., of crops and potential damage thereof) from edge devices (e.g., drones at a particular zip code, such as 10603) whenever crop damage seems present; requests for all information if a particular type of vehicle (e.g., a yellow sports car) seems present; alerts and supporting data (e.g., with ML/AI processing) when a particular object (e.g., a military vehicle, a person, etc.) is detected nearby to some designated location; alerts and supporting data (e.g., with ML/AI processing) if there appears to be an oil spill or other environmental catastrophe nearby to some designated location (e.g., [X,Y] coordinates or other geographic location); etc.

Figure 3:
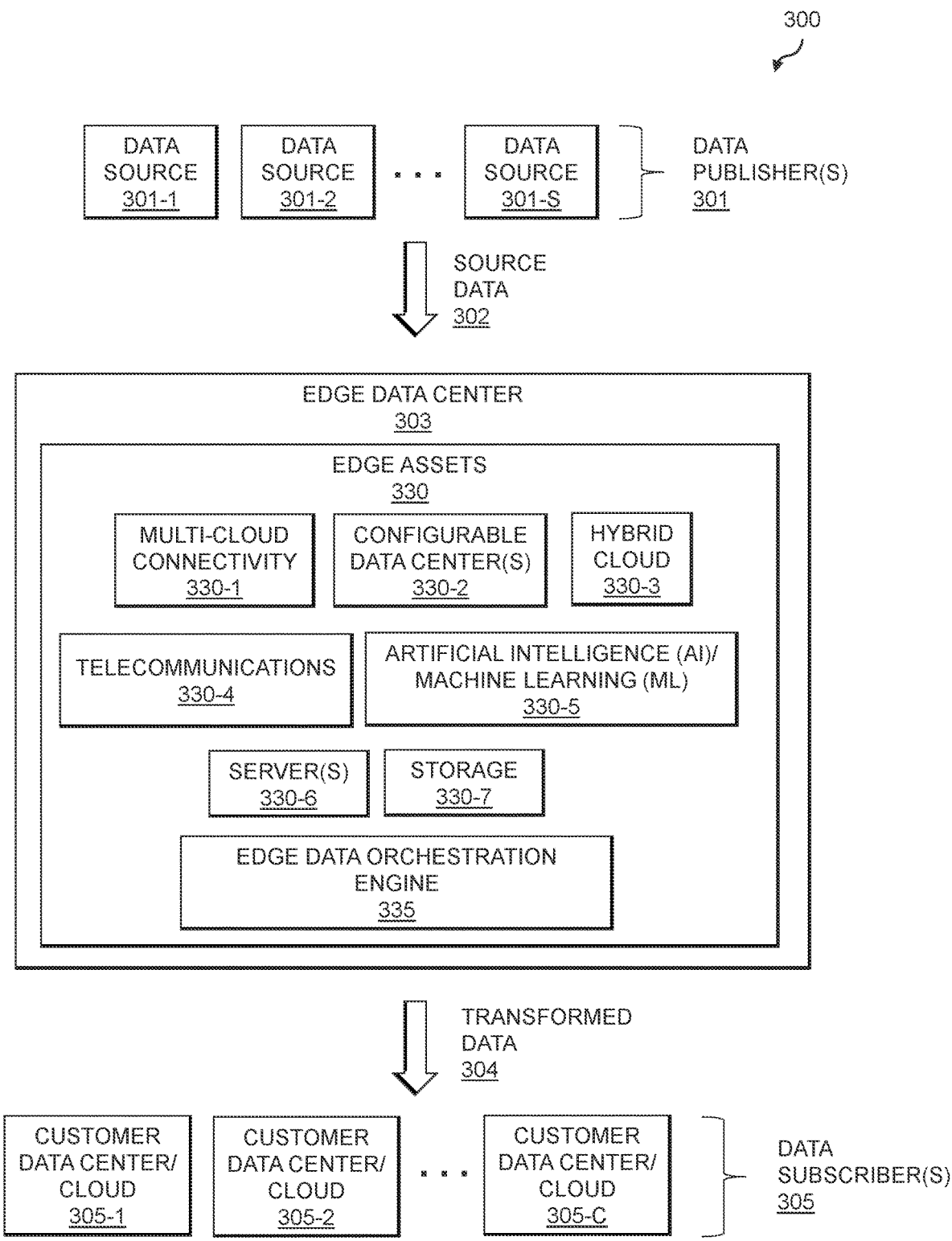
FIG. 3 shows a system with an edge data center implementing an edge data orchestration engine for processing edge data obtained from data publishers and transformed for data subscribers in an illustrative embodiment.

FIG. 3 shows a system 300, including a set of data sources 301-1, 301-2, . . . 301-S (collectively, data sources or data publishers 301) which provide source data 302 to an edge data center 303. The edge data center 303 may implement various edge assets 330 (e.g., on-premises and/or collocated), including multi-cloud connectivity 330-1, configurable data centers 330-2, hybrid cloud 330-3, telecommunications 330-4, AI/ML 330-5, servers 330-6, storage 330-7, and an edge data orchestration engine 335. As will be described in further detail below, the edge data orchestration engine 335 can use other ones of the edge assets 330 of the edge data center 303 for performing transformations on the source data 302 to generate (raw and/or transformed) data (e.g., raw and/or transformed data) and/or results of data analysis that can be provided to different endpoints, shown as customer data centers/clouds 305-1, 305-2, . . . 305-C (collectively, data subscribers 305). Such provided data and data analysis results may be provided using "push" mechanisms, "pull" mechanisms, combinations thereof, etc. The edge data orchestration engine 335 may provide functionality for edge data enablement services (e.g., per endpoint or data subscriber data sharding, transformation, authentication, authorization, subscription, etc.).

The source data 302 may comprise raw, unauthenticated, untrusted and potentially valuable data from the data publishers 301. The data associated with data publishers 301 may be diverse types of data from sources or edge devices, including but not limited to surveillance data, agriculture data, industrial data, transportation data, IoT data, sensor data, wearable device data, gaming data, inventory data, virtual reality (VR) data, augmented reality (AR) data, health care data, etc. The transformed data 304 may comprise data or data analysis results in various formats and implementations for consumption by different ones of the data subscribers 305. Such different formats and implementations may include, for example, relational database (e.g., SQL) format, non-relational database (e.g., NoSQL) format, binary large objects (BLOBs), images, videos, text files, etc. Different ones of the data subscribers 305 may be associated with different cloud service providers (CSPs), such as Microsoft Azure, Amazon Web Services (AWS), Google Cloud, etc. One or more of the data subscribers 305 may be implemented outside of a cloud of a CSP, such as via an Internet-connected customer data center or client device.

In some embodiments, the data publishers 301 are referred to as a first customer set and the data subscribers 305 are referred to as a second customer set. The data publishers 301 include entities that collect, transform, analyze and manage data publication. Templates (e.g., for configurable workflow pipelines as will be discussed in further detail below) may be instantiated and executed on the equipment of the data publishers 301 (e.g., at least one template for a particular one of the data subscribers 305). The data subscribers 305 include any entities that are allowed to receive any form, subset or full use of data produced by one or more of the data publishers 301 in a custom fashion. The data publishers 301 and data subscribers 305 may be government or private entities. It should also be appreciated that a particular entity may be both a data publisher and a data subscriber (e.g., it may operate edge devices which are a source of data provided to one or more other endpoints, and may also consume data received from edge devices operated by one or more other entities).

Each of the data publishers 301 may be a source of various data that is to be served to one or more of the data subscribers 305, where each of the data subscribers 305 has its own intelligent and unique needs (e.g., there is many-to-many diversification). An edge ecosystem for such diverse data subscribers 305 can handle live and historical data, different permissions (e.g., data subscription and isolation), different formats (e.g., data technologies), different notification mechanisms (e.g., representational state transfer (REST) application programming interfaces (APIs), email, etc.), different local/archive storage schedules, different analyses, etc. A fuzzy logic module may be incorporated and used to help interpret vague or incomplete requests from the data subscribers 305. Examples of such requests may be: to alert (e.g., via a REST API, email, etc.) and send corresponding video, images locations and analysis of crop damage (e.g., from a particular drone at a particular postal code) whenever crop damage seems present; to send all information if a vehicle (e.g., such as a vehicle with certain designated characteristics such as one or more specific colors) is seen in a particular zip code or other designated location; to alert and supply data when some designated object (e.g., a military vehicle, a person, etc.) is sensed nearby to some designated location; to run retroactive (e.g., big data) searches to identify various conditions (e.g., a telemetry parameter T with a value of U for a vehicle with a vehicle identification number (VIN) V, when a vehicle or person was seen at some location coordinate [X,Y], etc.).

The technical solutions described herein enable prioritization of opportunities and integrations, and associated staging plans for configurable workflows. Workflows may be configured across a variety of application domains, including but not limited to AI/ML, security, telemetry, DTs, predictive modeling, ADAS, environmental analysis, etc. Workflows may also be configured for big data storage and integration (e.g., local, archive, etc.), and may be further configured to leverage GPU or DPU software development kits (SDKs), fuzzy logic query support interactive/static dashboard integrations, etc. Using the technical solutions described herein, enhanced and sporadic far-edge data optimizations are enabled (e.g., assuming data is made available to middle or edge data centers implementing edge data orchestration engines as described).

Edge data centers highlight potential opportunities for integrating heterogeneous distributed customer data enablement application infrastructure, which can publish edge-transformed data to subscribers (e.g., ad hoc, scheduled, etc.). For example, data publishers 301 may utilize certified edge assets 330 of the edge data center 303 to meet the needs of varied data subscribers 305. Different ones of the data subscribers 305 may be interested in the same (or variants) of data from the same one or ones of the data publishers 301. Such different data subscribers 305 may prefer quick and custom solutions (e.g., such as transformed data and/or analysis of data) for such data. The edge data orchestration engine 335 may provide an extensible and customizable data workflow language and workflow pipeline software at the edge data center 303 to orchestrate data management for diverse and heterogeneous interests of the data subscribers 305. The edge data orchestration engine 335 can therefore provide an enterprise-differentiating edge data enablement ecosystem solution, which can provide various benefits including but not limited to increased revenue generation, improved resource utilization for the edge assets 330 of the edge data center 303, etc.

Figure 4:
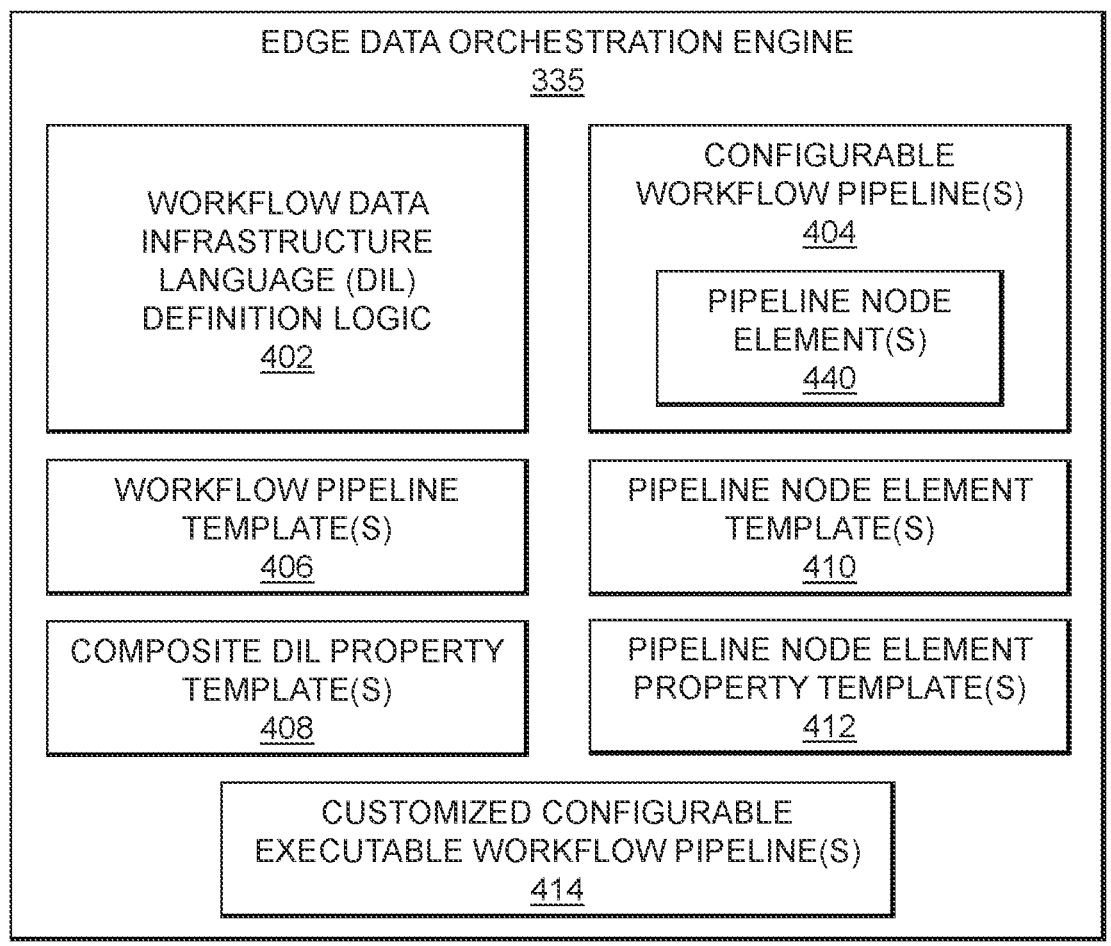
FIG. 4 shows a detailed view of the edge data orchestration engine of FIG. 3 in an illustrative embodiment.

The edge data orchestration engine 335, as shown in FIG. 4, implements workflow data infrastructure language (DIL) definition logic 402 and a configurable workflow pipeline 404. The configurable workflow pipeline 404 can generate different workflows using sets of pipeline node elements 440. The pipeline node elements 440 in the configurable workflow pipeline 404 may have associated pipeline node element templates 410, where the pipeline node element templates 410 may be parameterized and expressed according to a DIL instance. Each of the pipeline node element templates 410 may implicitly or explicitly specify flexible input and/or output data (e.g., one or more input and/or output data elements). In some cases, pipeline node element property templates 412 are associated with the pipeline node element templates 410, with the pipeline node element property templates 412 specifying parameter values for instances of the pipeline node element templates 410. The edge data orchestration engine 335 may further include workflow pipeline templates 406, where each of the workflow pipeline templates may be composed of one or more of the pipeline node element templates 410 (e.g., in many possible sequences) and/or one or more of the pipeline node element property templates 412 to create a desired parameterized workflow DIL definition logic 402 with associated (e.g., to be added) one or more composite DIL property templates 408 (e.g., that may specify values) that can result in instantiable configurable workflow pipelines 404. The customized configurable workflow pipelines 404 may be used by the edge data orchestration engine 335 to create one or more customized configurable executable workflow pipelines 414. The customized configurable executable workflow pipelines 414 may be scheduled for execution based on parameter values, which may be specified in the pipeline node element templates 410 or other definitions. Such a schedule may be flexible (e.g., one time, repetitive, upon manual and/or automated notification, etc.). It should be noted that the specifications of the various templates and property templates shown in FIG. 4 may be in graphical and/or textual format using a variety of desired notations and syntax.

The edge data orchestration engine 335 provides a data sharing (e.g., raw data, AI/ML data, transformed data, results of data analysis, etc.) and subscription ecosystem in the form of a data enablement pipeline providing a new enterprise datacenter infrastructure-as-a-service (IaaS) application. The enterprise datacenter IaaS application enables data sharing edge ecosystem software that is configurable and customizable as per endpoint or other subscriber requirements. In this way, an enterprise operating the edge data center 303 can provide differentiation and monetization of the data sources 301, source data 302 and edge assets 330. The enterprise operating the edge data center 303 may sell edge data that the enterprise gathers into the edge data center 303, or enable tenants and/or hosts of the enterprise's edge data center 303 to monetize edge data. In some cases, the edge data center 303 uses the edge data orchestration engine 335 for CSP data transfer mechanisms.

The workflow DIL definition logic 402 is used to define and configure workflows in an enterprise DIL using the pipeline node elements 440 of the configurable workflow pipeline 404. The pipeline node elements 440 may comprise elements for: data allocation, data partitioning, data sharding; parameterized transformation sequences; security (e.g., authentication, authorization, encryption, etc.); AI/ML transformation with semantic content; etc. In some embodiments, the pipeline node elements 440 are implemented as plug-in extensions, which are extensible and can evolve over time. For example, various DPUs, SDKs, transformations, partitioning, formatting, and so on may be developed and evolve over time.

Figure 5A:
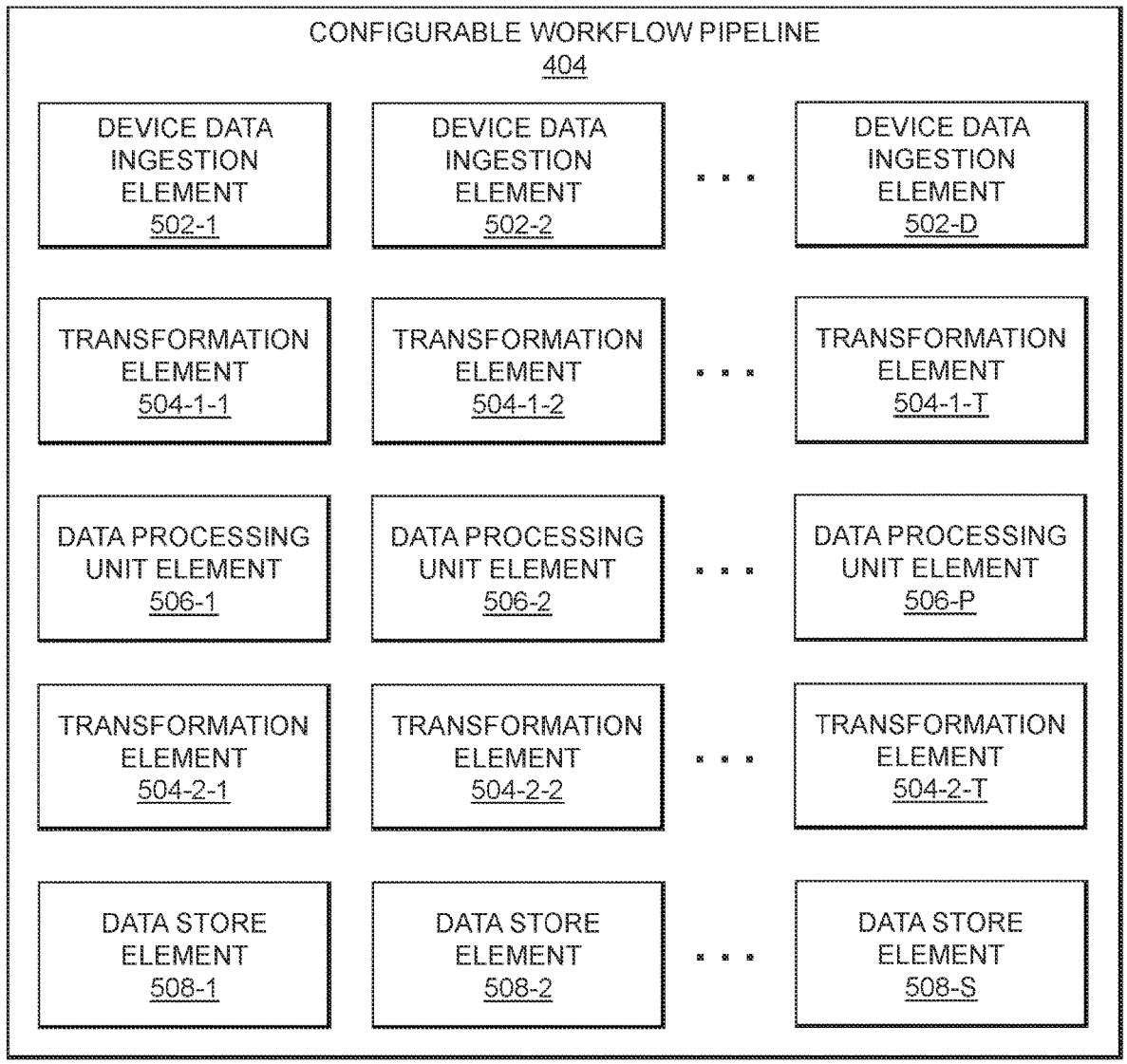
FIGS. 5A-5D show examples of pipeline elements which may be used to generate configurable workflows in an illustrative embodiment.

The edge data orchestration engine 335 utilizes the workflow DIL definition logic 402 to generate DIL instance configurations that may be parameterized for specific endpoints to drive new configurable workflows (e.g., using combinations of the pipeline node elements 440) in the configurable workflow pipeline 404. FIG. 5A shows examples of different ones of the pipeline node elements 440 which may be configured by a DIL instance configuration for use by a specific endpoint. It should be noted that data is typically but not always ingested into the edge data center 303 from edge devices (e.g., data publishers 301).

As shown in FIG. 5A, the pipeline node elements 440 include device data ingestion elements 502-1, 502-2, . . . 502-D (collectively, device data ingestion elements 502), transformation elements 504-1-1, 504-1-2, . . . 504-1-T (collectively, transformation elements 504-1), DPU elements 506-1, 506-2, . . . 506-P (collectively, DPU elements 506), transformation elements 504-2-1, 504-2-2, . . . 504-2-T (collectively, transformation elements 504-2), and data store elements 508-1, 508-2, . . . 508-S (collectively, data store elements 508). Each of the device data ingestion elements 502 is responsible for ingesting data from one or more of the edge devices 501 (shown in FIGS. 5B-5D), and the transformation elements 504-1 may apply any needed transformations to the ingested data as specified by DIL instance configurations. A given one of the device data ingestion elements, such as device data ingestion elements 502-1, may be coupled with one or more of the edge devices 501 associated with a specific location (e.g., such as one or more cameras at a particular location in postal code 78704). Accordingly, the given device data ingestion element 502-1 may be identified using one or more properties that may be common to more than one of the edge devices 501. For example, there may be more than one camera edge devices 501 and more than one of the device data ingestion elements 502 for the postal code 78704. The DPU elements 506 process the ingested data (as transformed via the transformation elements 504-1), and the processed data may be subject to further transformation via the transformation elements 504-2 (e.g., such as security transformations including encryption, signing, etc.) as specified by DIL instance configurations. This processed data (as transformed via the transformation elements 504-2) is then provided to the data store elements 508 for transfer to endpoints (e.g., client applications, devices or data centers based on the specifications of the DIL instance configurations and the particular data storage technologies used at the different endpoints). FIG. 5A is a descriptive example of some of the possible pipeline node elements 440 that may participate in the configurable workflow pipelines 404. Different workflow instances (e.g., different ones of the customized configurable executable workflow pipelines 414) may take different processing paths through the various elements shown in FIG. 5A (e.g., including possibly skipping some element types and/or element instances).

Figure 5B:
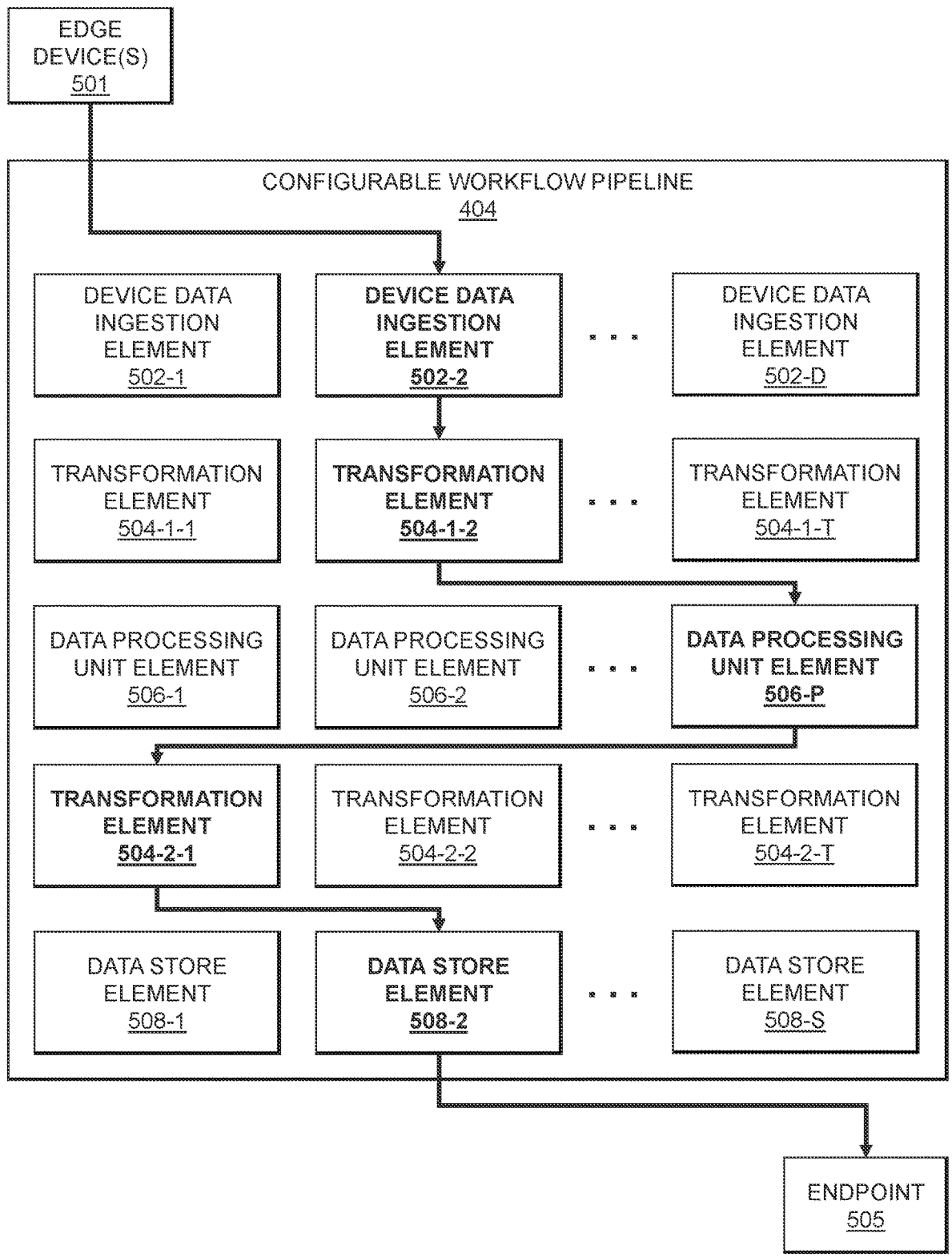

FIG. 5B illustrates a particular configured workflow, which ingests data from edge devices 501 into device data ingestion element 502-2 (e.g., for camera data). Such camera data is subject to optional transformation in transformation element 504-1-2 before being provided to data processing unit element 506-P (e.g., providing a graphics toolkit), and then subsequently to transformation element 504-2-1. The transformed data is then provided to data store element 508-2 providing a segmentation analysis and filter for data provided to a specified endpoint 505 (e.g., an endpoint "X" of a customer "Y" data center).

Figure 5C:
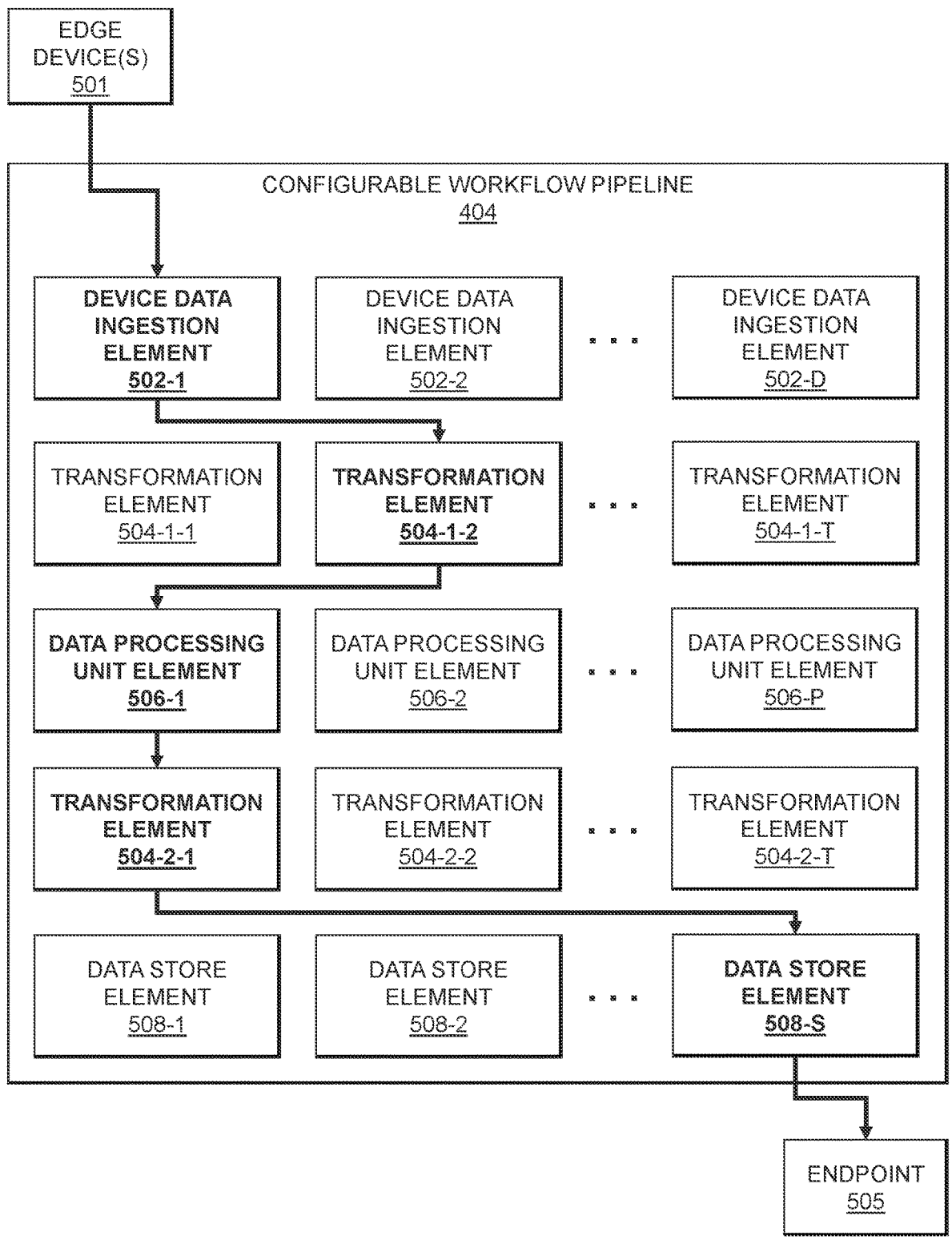

FIG. 5C illustrates another particular configured workflow, which ingests data from edge devices 501 into device data ingestion element 502-1 (e.g., for sensor data). Such sensor data is subject to optional transformation in transformation element 504-1-2 before being provided to data processing unit element 506-1 (e.g., providing a data processing toolkit), and then subsequently to transformation element 504-2-1. The transformed data is then provided to data store element 508-S providing selection and filtered for data provided to a specified endpoint 505 (e.g., an endpoint "X" of a customer "Y" data center). The data store elements 508-S may send data, stored data, and/or notify the endpoint 505 of availability of data using any available technology, including but not limited to API calls, emails, etc.

Figure 5D:
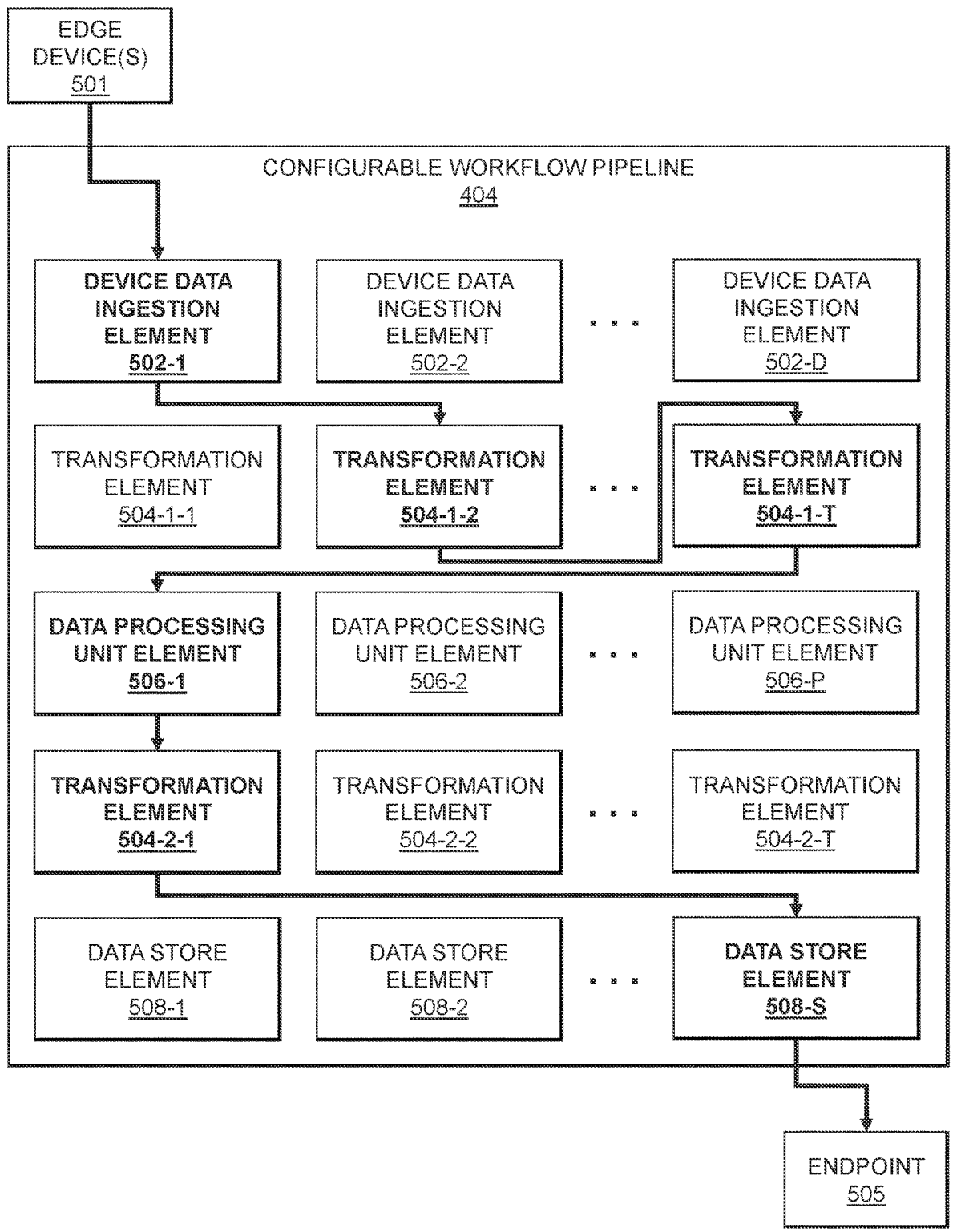

FIG. 5D illustrates another particular configured workflow, which ingests data from edge devices 501 into device data ingestion element 502-1 (e.g., for sensor data). Such sensor data is subject to optional transformation in transformation element 504-1-2 (e.g., for partitioning) before being provided to another transformation element 504-1-T for one or more additional transformations, and then from transformation element 504-1-T to data processing unit element 506-1 (e.g., providing a still image sequence data processing analysis toolkit), and then subsequently to transformation element 504-2-1 (e.g., to combine, compress, and/or encrypt the data). The transformed data is then provided to data store element 508-S providing selection and filtering for data provided to a specified endpoint 505 (e.g., an endpoint "X" of a customer "Y" data center). The final data may include, for example, one or more images, descriptive segmented analysis queried finding(s) of interest of the contents of such images, etc. Such information may include additional data such as location coordinates and additional descriptive information as may be configured and possible in processing of the various pipeline node elements 440 of a configurable workflow pipeline 404.

It should be noted that the flow among elements in a configurable workflow pipeline 404 need not be monotonically downward, and can skip various rows of the elements and go through multiple elements instances in one or more of the rows (e.g., multiple transformation elements as in the FIG. 5D example). The rows and columns of elements shown in FIGS. 5A-5D are not restrictive; there may be any number of rows and columns of elements in various orders (e.g., possible repetitive). Any type of execution graph or path through the pipeline node elements 440 is possible. Further, a particular configurable workflow pipeline 404 may comprise an execution graph instance which combines, repeats and separates the node types and instances of the pipeline node elements 440 without restriction as logically correct and needed for a particular implementation. An example is that both certified (e.g., tested) and other data processing unit elements 506 may be used in a DIL specification. For example, different types of the data processing unit elements 506 may have complementary capabilities (e.g., such as AI/ML SDKs with different models) which may necessitate creating custom execution graph sequence instances as needed for any endpoint subscriber. Further, the output of one of the pipeline node elements 440 may be used as input to multiple other ones of the pipeline node elements 440, and that outputs from multiple ones of the pipeline node elements 440 may be provided as input to a single one of the pipeline node elements 440.

The construction of execution graphs through the elements shown in FIGS. 5A-5D may utilize workflow pipeline templates 406 and composite DIL property templates 408, where the workflow pipeline templates 406 may include one or more of the pipeline node element templates 410 and associated pipeline node element property templates 412 to create the execution graphs as customized configurable executable workflow pipelines 414.

The edge data orchestration engine 335 may illustratively be implemented as software over other types of hardware and/or software assets (e.g., other ones of the edge assets 330) of the edge data center 303. A configurable workflow pipeline 404 may provide automation through command line interface (CLI) control on the pipeline node elements 440 that may be considered an execution graph. Such an execution graph may be specified and modeled using instances of any combination of the device data ingestion elements 502, transformation elements 504, data processing unit elements 506, data store elements 508, and other elements not shown in FIGS. 5A-5D. Instances of each such execution node may be associated with custom properties whose values may be specified as parameters in customized templates. Some non-limiting examples follow. An example template for a camera device data ingestion element 502 may be camera postal code (e.g., there may be multiple such cameras with the same zip code value instance), and camera metadata may include fixed or dynamic (e.g., mobile) observation location coordinates. Thus, for example, a template for a camera device data ingestion element 502 may include both in motion as well as not-in-motion coordinate properties. A DIL template specification may imply multiple such physical device data ingestion element 502 instances sharing coordinate properties approximately similar to or the same as queried coordinates. Thus, an input or output from the device data ingestion elements 502 may represent aggregated information via separate serial and/or parallel execution invocations thereof. Such multiplicity may be specified explicitly in a DIL (e.g., using separate serial execution records) or may be implied in an invocation of a DIL based on specified values of template parameters. Hence, any output from any DIL template node may be implemented with multiplicity representations (e.g., count(s), array(s) and associated execution criteria) to allow for a more general parallel implementation. Various other combinations and aggregations are possible for various types of the pipeline node elements 440 in a configurable workflow pipeline 404.

Edge data centers, such as edge data center 303, provide a potential opportunity for integrating heterogeneous distributed customer data enablement application infrastructure. The edge data center 303, via the edge data orchestration engine 335, can publish raw edge data and edge transformed data from the data publishers 301 to the data subscribers 305. Different ones of the data subscribers 305 (e.g., different target customers, end-users or other subscribers) may be interested in the same edge device data (or variants thereof), but prefer solutions that are easily and quickly extensible and customizable based on technologies, content, transformations and security. The DIL provides an extensible data workflow language and workflow pipeline software engine at edge data centers for orchestrating data management for diverse and heterogeneous data subscribers. The edge data orchestration engine 335 provides a software workflow edge orchestration language (e.g., an enterprise DIL) and configurable workflow pipelines for data enablement that can: drive adoption of an operator of the edge data center 303's portfolio of edge assets 330; help solve edge heterogeneity application infrastructure data enablement problems; speed up adoption of edge data center choice; offer revenue opportunities (e.g., data and resource subscriptions, licensing, etc.); help differentiate an enterprise's edge data center solution; etc. It should be noted that while various embodiments are described with respect to implementing functionality of the edge data orchestration engine 335 within the edge data center 303 infrastructure, the edge data orchestration engine 335 or at least portions of the functionality thereof may be implemented in a core or cloud data center, in edge devices, etc.

As noted above, the edge data orchestration engine 335 may be used for responding to various different requests for data that originate at edge devices. Examples of such requests include: alerts (e.g., with machine learning (ML) and artificial intelligence (AI) processing) of video, images, locations and analysis (e.g., of crops and potential damage thereof) from edge devices (e.g., drones at a particular zip code, such as 10603) whenever crop damage seems present; requests for all information if a particular type of vehicle (e.g., a yellow sports car) seems present; alert and supply data (e.g., with ML/AI processing) when a particular object (e.g., a military vehicle, a person, etc.) is detected nearby to some designated location; alert and supply data (e.g., with ML/AI processing) if there appears to be an oil spill or other environmental catastrophe nearby to some designated location (e.g., [X,Y] coordinates or other geographic location); combinations thereof, etc. Shared data can include images, videos (e.g., around detection times), objects of interest and information about objects of interest as detected by DPUs, etc., at the edge data center 303. Coordinates, timestamps, labeled data files, enhanced images, etc. can also be supplied from the edge devices or other data publishers 301. The ingest device sources or data publishers 301 may include drones, lidars, cameras, IoT sensors, etc. It should be noted that information and notifications sent from one or more of the edge computing sites 104 may result in automated or other actions based on logic of the edge-hosted applications 108-E and the core-hosted applications 108-C, and such actions may involve various output devices (e.g., gates, oil valves, etc.).

The edge data orchestration engine 335, in some embodiments, integrates critical data enablement and protection for edge-core infrastructure automation, and implements "need-to-know" transfers of data (e.g., from edge devices to one or more endpoints in a core or cloud data center). Such functionality is enabled via the configurable workflow pipeline 404, which can create repeatable workflows for all compatible environments and applications (e.g., physical and/or cloud). The workflow DIL definition logic 402 allows for creation of custom templates (e.g., in the DIL) that can extend replication-only tools with: graphical tools which may be compiled into programs and/or orchestration infrastructure languages; data transformation parameters; pass-by-reference files, BLOBs, images, etc. in the recipient-only data sources; etc.

Figure 6:
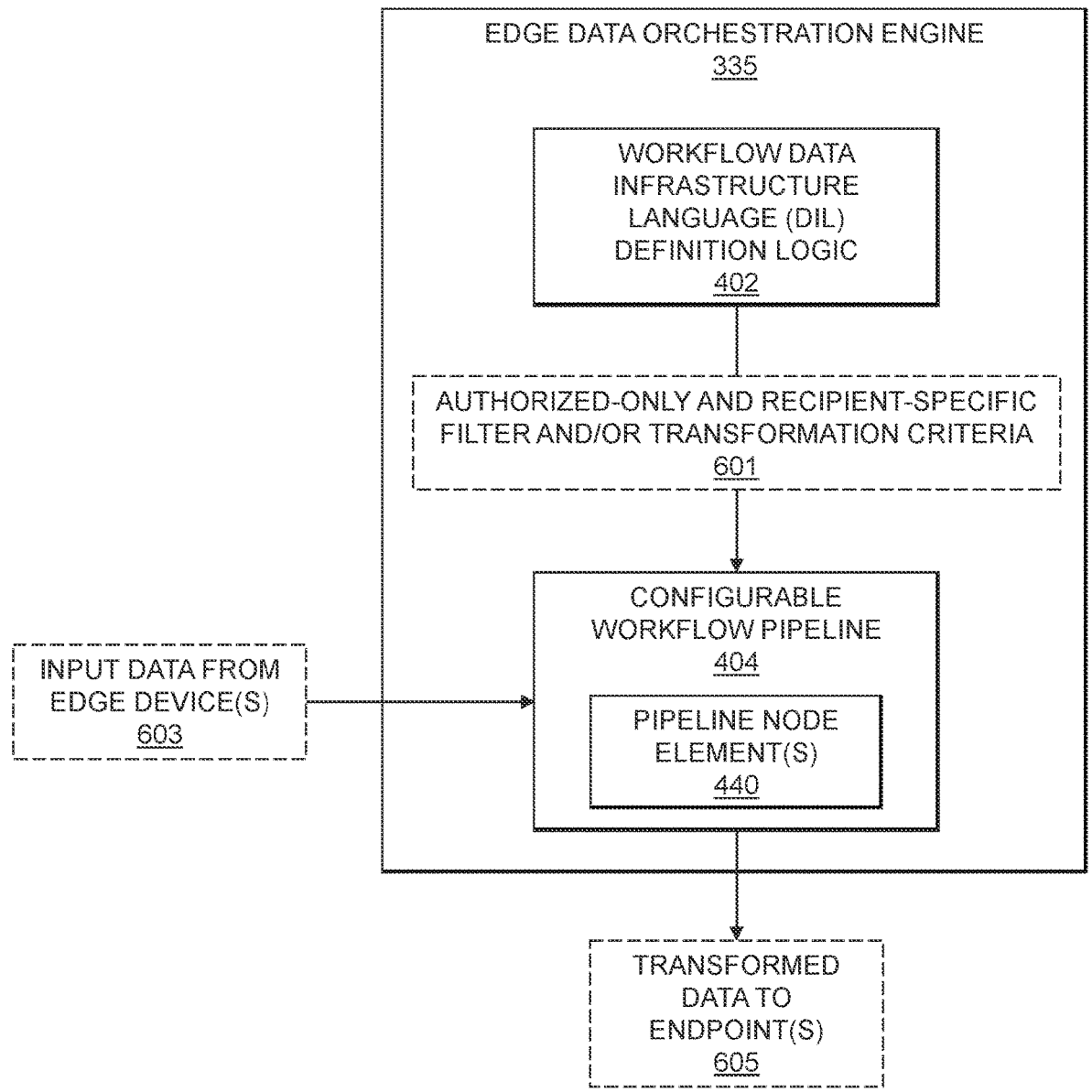
FIG. 6 illustrates a process flow for transforming edge data using a data infrastructure language and configurable workflow pipelines in an illustrative embodiment.

FIG. 6 illustrates the overall process, where the workflow DIL definition logic 402 of the edge data orchestration engine 335 is used to generate authorized-only and recipient-specific filter and/or transformation criteria 601 (e.g., specified in the DIL) to build one or more configurable workflows using the pipeline node elements 440 of the configurable workflow pipeline 404. This may include use of one or more of the workflow pipeline templates 406, composite DIL property templates 408, pipeline node element templates 410 and pipeline node element property templates 412 that are used in instantiating one or more of the customized configurable executable workflow pipelines 414. Using such configured workflows, input data 603 (e.g., from edge devices) is suitably processed to generate transformed data 605 (e.g., which can include one or more associated notifications) that is provided to one or more designated endpoints. Advantageously, the functionality of the edge data orchestration engine 335 is data agnostic, and is simple with significantly lower error rates. The edge data orchestration engine 335 is applicable to emerging edge-core infrastructures, is extensible, and enables an enterprise operating the edge data center 303 to implement various endpoint-specific configurable workflows for transforming data from data publishers 301 (e.g., edge devices) to data subscribers 305 (e.g., endpoints in subscriber data centers, which may be part of a core infrastructure, cloud infrastructure, Internet-connected data center or devices, etc.).

The technical solutions described herein provide various initial design flexibilities, including per-endpoint (e.g., even for a single customer or end-user, such as a multi-location customer or end-user) configuration of workflows with some initial and various pipeline node element templates 410 and pipeline node elements 440. Extensibility may be achieved by adding various pipeline node element templates 410, creating various pipeline node elements 440 and various configurable workflow pipelines 404. The edge data orchestration engine 335 is able to provide real-time as well as scheduled and on-demand data snapshots, and supports various target databases and data formats (e.g., various cloud platforms, remote edge platforms, etc.). The edge data orchestration engine 335 is further able to provide security through limiting the selection, type and format of data that is provided to different endpoints, through the use of selection, translation, transformation, encryption and other approaches for securing data in transit, etc. The edge data orchestration engine 335 is further able to utilize DPUs of the edge data center 303 as needed or selected. Thus, heterogeneous local and/or remote edge data center customers and tenants do not need their own DPUs, and can get custom transformed or processed data anywhere it is desired. The functionality of the edge data orchestration engine 335 may be provide in accordance with an "as-a-service" model, may be bundled with other edge assets 330 in an edge offering, etc.

Figure 7:
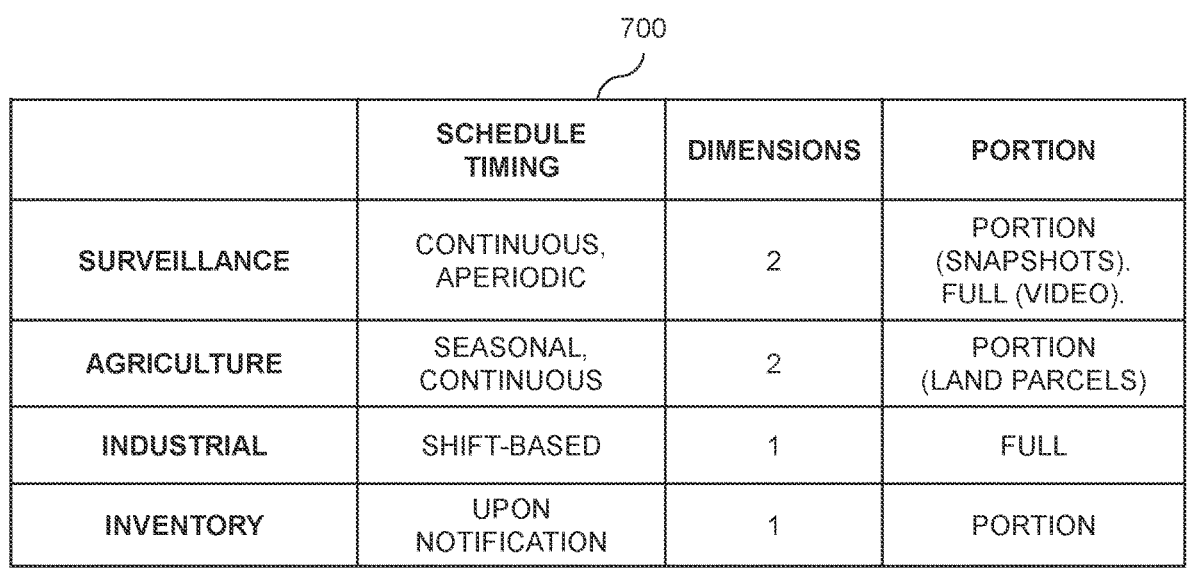
FIG. 7 shows a table of various example use cases for edge data handling in an illustrative embodiment.

FIG. 7 shows a table 700 illustrating various different use cases for edge data handling, including use cases of surveillance, agriculture, industrial and inventory. It should be appreciated that these use cases are presented by way of example only, and that embodiments are not limited solely to these specific use cases. The technical solutions described herein may be used for handling various other types of data collected from edge devices which are to be transformed or otherwise processed at an edge data center and then provided to endpoints. For each of the use cases shown in the table 700, various parameters are illustrated including schedule timing, number of dimensions, portion and comments. For example, in the surveillance use case, edge data may be shared continuously or on an aperiodic basis, and may include two dimensions with the portion being snapshots or full video surveillance. As another example, in the agriculture use case, the schedule timing may be seasonal or continuous, with two dimensions and be at the portion of individual land parcels or groups thereof. Another example is for an inventory mechanism, whereby a change in inventory notification or suspicion thereof (e.g., possibly at one of the core computing sites 102) may result in an invocation of an image or video capture at one or more of the edge computing sites 104 for possible transfer to the one or more core computing sites 102.

Figure 8:
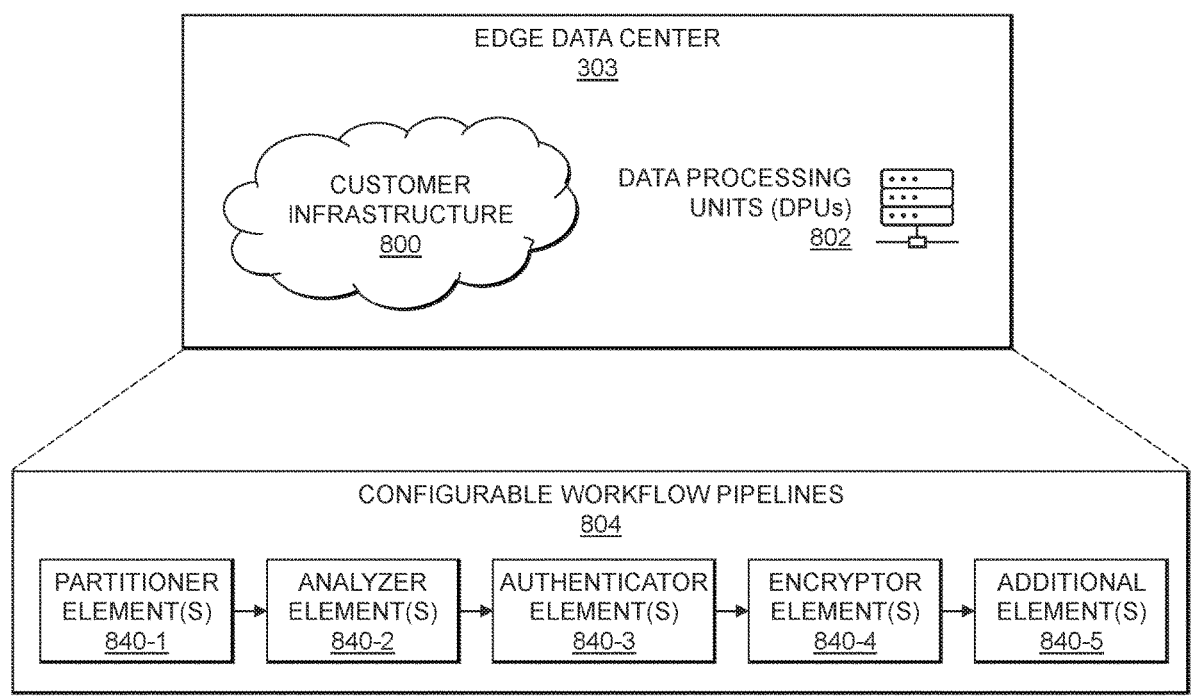
FIG. 8 shows an edge data center providing a set of configurable workflow pipeline elements in an illustrative embodiment.

FIG. 8 shows an example of the edge data center 303 providing a set of configurable workflow pipelines 804 using customer infrastructure 800 and DPUs 802. The configurable workflow pipelines 804 may include various combinations of partitioner elements 840-1, analyzer elements 840-2, authenticator elements 840-3, encryptor elements 840-4 and additional elements 840-5 (collectively, elements 840). Here, the edge data center 303 can provide IaaS via data enablement orchestration configured for different recipient endpoints with: custom processing paths among the elements 840 for different workflows; custom parameters for each of the elements 840 in each of the different workflows; and pluggable and extensible elements 840 used in each of the different workflows. Orchestration configuration code may be used by different applications to process data and deliver the processed data to different endpoints.

Figure 9:
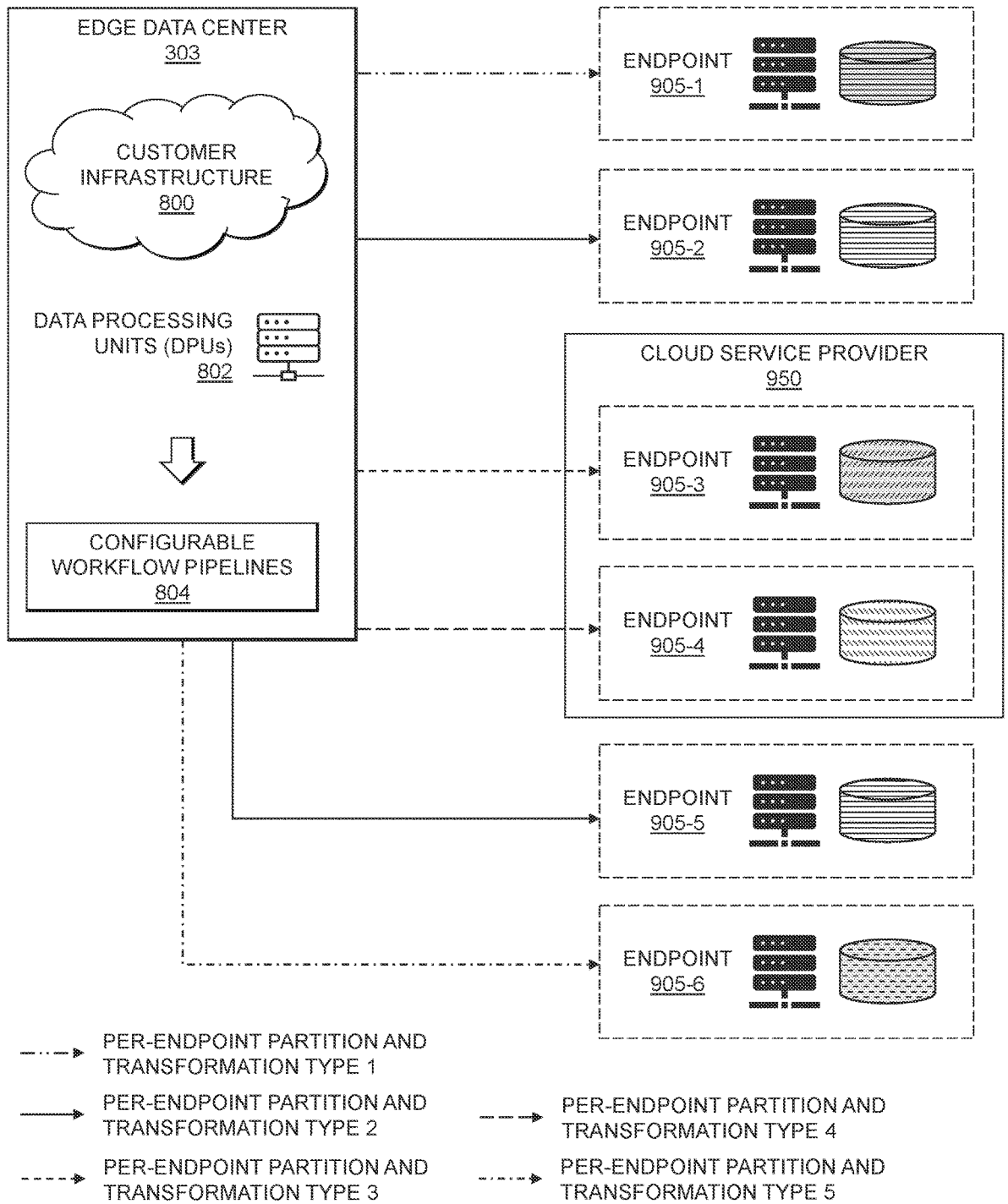
FIG. 9 shows different transformation types applied by an edge data orchestration engine to edge data that is provided to different endpoint subscribers in an illustrative embodiment.

FIG. 9 shows an example of different transformation types applied to data that is provided to different ones of a set endpoints 905-1, 905-2, 905-3, 905-4, 905-5 and 905-6 (collectively, endpoints 905) via the configurable workflow pipelines 804 of the edge data center 303. Here, a first per-endpoint partition and transformation type is applied to data supplied to endpoint 905-1, a second per-endpoint partition and transformation type is applied to data supplied to endpoints 905-2 and 905-5, a third per-endpoint partition and transformation type is applied to data supplied to endpoint 905-3, a fourth per-endpoint partition and transformation type is applied to data supplied to endpoint 905-4, and a fifth per-endpoint partition and transformation type is applied to data supplied to endpoint 905-6. In the FIG. 9 example, the endpoints 905-3 and 905-4 are associated with a same cloud service provider 950 (e.g., different governmental agencies, such as different agriculture and environmental agencies). Other ones of the endpoints 905 (e.g., vehicle manufacturers, autonomous vehicle systems, law enforcement agencies, social media platforms; etc.) may each be associated with a distinct cloud service provider, or may be part of Internet-connected endpoints or other types of data centers.

Figure 10:
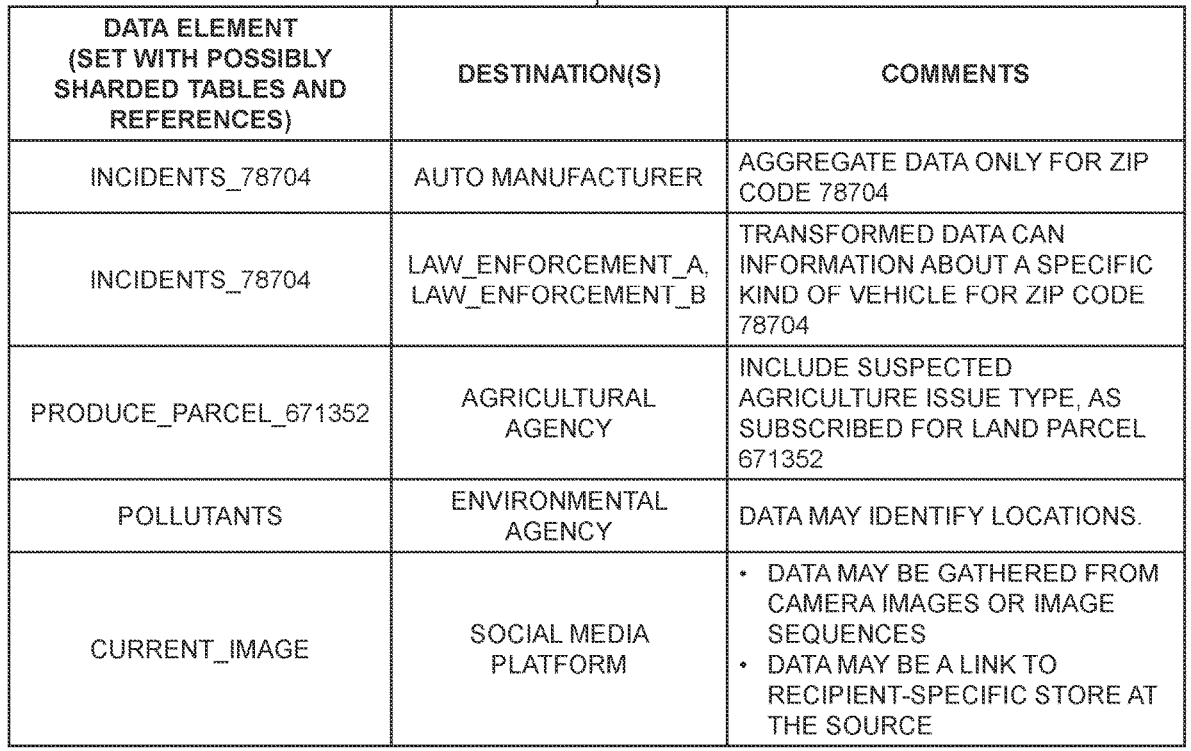
FIG. 10 shows a table of various example edge-collected data elements provided to different endpoint subscribers in an illustrative embodiment.

A data source or data publisher may not want to send all of the data it produces to each of the endpoints 905. Data which originates at a data source or data publisher may be filtered or transformed as specified by the data source or data publisher, and/or as specified or requested by different ones of the endpoints 905. FIG. 10 shows a table 1000 illustrating different examples of edge-collected data elements which are provided to different destinations or interested parties (e.g., different ones of the endpoints 905). The rows of the table 1000 illustrate "authorizations" where the data elements are provided. If an authorization is not configured for a particular data element, that data element will not be provided to any destination but may still be stored at its source (e.g., the data source or data publisher, or an edge data center associated with the data source or the data publisher). In the example of FIG. 10, a set of incidents data "incidents_78704" is provided to both an auto manufacturer and two law enforcement agencies (law enforcement A and law enforcement B), but with different filtering and transformation applied thereto. The auto manufacturer will receive only aggregate data for the ZIP code 78704, while the law enforcement agencies will receive only information about a specific kind of vehicle for the ZIP code 78704.

FIG. 11 shows a table 1100 illustrating diverse edge data types and technologies, including for data forms such as tables with technologies of SQL and NoSQL, files with technologies such as copy and transfer, etc. The table 1100 also illustrates different possible implementations, including: SQL database types; NoSQL database types; Secure Copy (SCP)/Copy (CP), Secure File Transfer Protocol (SFTP), File Transfer Protocol (FTP); etc. For each of the different edge data types shown in the table 1100, raw or transformed data can be sent.

FIGS. 12A and 12B show pseudocode 1200 and 1205 of an enterprise-specific IaaS data definition language and directives. It should be noted that the pseudocode 1200 and 1205 are presented by way of illustrative concept examples only, and that specific embodiments may utilize other formatting or code types, such as JavaScript Object Notation (JSON), Yet Another Markup Language (YAML), etc. More particularly, FIG. 12A shows pseudocode 1200 for a sample IaaS data enablement description, and FIG. 12B shows pseudocode 1205 for a sample data processing configuration.

FIGS. 13A-13C show additional pseudocode for data enablement. More particularly, FIG. 13A shows pseudocode 1300 of primitive directives that may be used in creating configurable workflow templates such as those shown in the pseudocode 1305, 1310, 1315, 1320 and 1325 of FIGS. 13B and 13C. A pipeline may be defined as a schedule of actions, where an action may be labeled as acquire, transform (zero or more), transfer and notify. The pseudocode 1305 shows a generic pipeline template. The pseudocode 1310 shows a generic AI/ML pipeline template. The pseudocode 1315 and 1320 show generic SQL action templates. The pseudocode 1325 shows a generic event/trigger SQL action template. The various example templates shown in FIGS. 13B and 13C may each be customized for different endpoints. FIGS. 12A-12B and 13A-13C are generic descriptive illustrations of the concepts disclosed herein. A specific example, with a representative notation, is described in FIGS. 14A-14F and 15, described below.

FIG. 14A shows a generic set of categories of entries that may be used to specify a generic (e.g., abstract) form of pseudocode specification 1400 for a pipeline node element template 410. In the pseudocode 1400 of FIG. 14A (as well as in the pseudocode 1405, 1410, 1415, 1420 and 1425 of FIGS. 14B-14F), "//" is used as a prefix to identify comments, and the end-of-line "\" character shows that relevant information is continuing on the next line. A "SYM" prefix is used to illustrate some example parameters than can be used with one or more of the pipeline node elements templates 410, the customized configurable executable workflow pipelines 414, etc. A pipeline node element property template 412 of the FIG. 14A pipeline node element template 410 pseudocode specification 1400 is shown in FIG. 14B. It should be noted that in some cases an abstract pipeline node element template 410, by itself, may serve descriptions, and thus may not need property values specified for one or more entries in an associated pipeline node element property template 412.

A top-level abstract pipeline node element template 410 and associated pipeline node element property template 412 may be considered reasonable places to put global information that all other elements can use. An example is a directive variable information that may specify how frequently a customized configurable executable workflow pipeline 414 should be run (e.g., on a periodic schedule, on invocation possibly based on some trigger from an edge device 501, an edge-hosted application 108-E, a core-hosted application 108-C, etc.). If a schedule directive is set as such (e.g., to a key word INVOKE) or is not explicitly specified, a default behavior (e.g., such as invoked using a command line) may be assumed. An edge data orchestration engine 335 may sequentially (in order) process data of one or more pipeline node element templates 410 and one or more pipeline node element property templates 412, and a previously-explained variable may be used in one or more subsequent pipeline node element templates 410 and/or pipeline node element property templates 412. A schedule parameter may be used by the edge data orchestration engine 335 or a customized configurable workflow pipeline 404 to schedule executions of a customized configurable executable workflow pipeline 414. A specific pipeline node element template 410 (e.g., such as a device data ingestion element 502, a transformation element 504-1, a transformation element 504-2, a data processing unit element 506, a data store element 508, etc. as shown in the examples of FIGS. 5A-5D) may have more concrete specifications based on the outline of an abstract form as shown in FIG. 14A. For example, a particular type of device data ingestion element 502 may only have an output pipeline node element property template 412 such as an output directory (e.g., /home/camera_i_output/jpeg). For such an example, sequences of still images captured from an associated edge device 501 may be produced in some format (e.g., Joint Photographic Experts Group (JPEG)) in some well-defined structure (e.g., such as a directory with time-stamped subdirectories). A specific edge device 501 may be described with an empty (e.g., non-functional) pipeline node element template 410 with a null (e.g., empty or non-existent) pipeline node element property template 412. Alternatively, as an implementation example, there may be a simple pipeline node element property template 412 value to specify a symbol, a value, or both (e.g., such as OUTPUT=SYM_CAMERA_I_OUTPUT=/home/camera_i_output/jpeg), where SYM_CAMERA_I_OUTPUT_DIR may be a symbol that is equivalent to /home/camera_i_output/jpeg. Such an example is shown in the pseudocode 1415 of FIG. 14D. In this example, the camera output directory could have been defined in FIG. 14B, but was specified in FIG. 14D (e.g., for representing a transformation of data from that directory) for readability. A data transformation element (e.g., one of the transformation elements 504-1) may include data and logic to transform a JPEG image to another format (e.g., Portable Network Graphics (PNG)) for further processing later in customized configurable executable workflow pipeline 414. This image type conversion is just for demonstration of a transformation, and is not necessarily a recommended image transformation. Pseudocode examples for such a pipeline node element template 410 and a corresponding pipeline node element property template 412 for such an image converter are shown in the pseudocode 1410 and 1415 of FIGS. 14C and 14D. As shown in FIGS. 14C and 14D, single function pairs of pipeline node element templates 410 and associated pipeline node element property template 412 definitions are possible.

Referring to FIG. 5A, an example of a pair of a pipeline node element template 410 and pipeline node element property template 412 that together can combine the functionality of the remaining stages of a pipeline instance of FIG. 5A will now be described. FIG. 14E shows pseudocode 1420 of specifications of how more than one element functionality (e.g., one of the data processing unit elements 506 and one of the data store elements 508, in this example) can be combined into one pipeline node element template 410. Furthermore, as shown by comments in the pseudocode 1420 of FIG. 14E, additional transformation (e.g., compression) can also be specified in a single pipeline node element template 410. It should be noted that the pipeline node element types shown in FIGS. 5A-5D are logical examples, and there may be requirements for other tasks (e.g., encryption). Similarly, any number of processing steps may be included in the pipeline node elements 440 which are selected and used in customized configurable executable workflow pipelines 414. FIG. 14E shows pseudocode 1420 of an example of a specific template created for a particular SDK (e.g., that may be associated with an example command /usr/bin/search_and_label_image_sequence_with_sdk_p). In this example, an SDK may be associated with a DPU 802 (specified by parameter SYM_DPU_INDEX_K), where the SDK invocation requires one or more specific commands and parameters. In this example, the invocation shown in FIG. 14E uses a directory of an input image sequence (e.g., which happens to have been prepared in a previous transformation in this illustrative example) from directory SYM_CAMERA_I_OUTPUT_PNG to analyze an image sequence using a DPU 802 specified with index SYM_DPU_INDEX_K. The program, specified by the command "search_and_label_image_sequence_with_sdk_p" may use a DPU 802 that may be an asset in an edge data center 303 with a desired model (e.g., identified with the parameter SYM_N_MODELS) to analyze the input images (which may be from a specific time duration) and generate a list of matches (or an empty list). In some embodiments, a single model SYM_N_MODELS may be specified at any one invocation. An output of this example invocation may contain one or more labeled image files and corresponding images in a structure that may be usable at an endpoint 505. A labeled image file may contain information about one or more named queried (e.g., of interest) objects, if found. An object of interest can be queried as specified with the objects parameter (e.g., of the search_and_label_image_sequence_with_sdk_p command) with the results stored in a parameterized directory specified using the output_dir CLI argument (e.g., set to SYM_CAMERA_I_SCENE_ANALYZED_RESULT_DIR). Note that a directory (e.g., SYM_CAM- ERA_I_OUTPUT_DIR) may contain data from more than one edge device 501. For example, data (e.g., sequences of still images) may also be organized by various properties of interest (e.g., copies of, or references to, still images from all edge devices 501 of a specific postal code). The symbol names that are shown in FIGS. 14A-14F and the associated references are presented by way of illustrative example only, and are not meant to imply any data arrangement limitations. Thus, it should be appreciated that the examples provided herein may apply to various groupings of data from one or more edge devices 501, and the example commands and templates are presented for illustration.

AI and ML models are often refined (e.g., retrained, replaced, amended, etc.). A model may be specified using parameters such SYM_N_MODELS to facilitate extensibility and flexibility. Any data processing unit may be shared, over time, for many customers (e.g., customers at one or more of the core computing sites 102). Therefore, an edge computing site 104 may efficiently serve such customers cost-effectively, using tested, current and/or desired models that can be refined over time. An edge computing site 104 may provide such activities on an as-a-service basis for one or more customers in various locations. A schedule parameter (e.g., such as the example shown in FIG. 14B) may also be used to invoke such a service (e.g., implemented by a customized configurable executable workflow pipeline 414) on a periodic, on-demand, or other basis. It should be noted that the input image sequence may include images for only specific time periods, and such images and associated information may be moved (e.g., as shown in FIGS. 14B and 14C), and/or programming scripts or additional functions may be implemented using one or more pipeline node element templates 410. Such a service (e.g., implemented by a customized configurable executable workflow pipeline 414) may also be invoked on-demand at any time using various mechanisms (e.g., an API invocation based on some trigger, manually, etc.). In the example pipeline node element template 410 of FIG. 14E, sym_core_2_endpoint_i_info is used to generically describe a set of values (e.g., address(es), port(s), directory(ies), authorization credential(s), etc.) that may be needed to send (e.g., using commands such as scp) information to an endpoint using a/usr/bin/notify_core_customer_of_result_and_send_data command program. A program such as/usr/bin/notify_core_customer_of_result_and_send_data may search discovered information (e.g., in a labeled file such as the file 1500 shown in FIG. 15) to notify an endpoint 505.

A command (e.g., a CLI command named search_and_label_image_sequence_with_sdk_p) in a pipeline node element template 410 may itself be a property for further ease of configuration and flexibility, and may be any executable form (e.g., a script, a machine code, byte code, etc.). Such a program may contain various capabilities and perform various functions such as one or more nodes in a customized configurable executable workflow pipeline 414. Referring to FIG. 14E, a next command may be one that uses some or all of the results of the search_and_label_image_sequence_with_sdk_p command. For example, a next CLI command may be notify_core_of_result_and_send_data, which may further transform (e.g., compress, encrypt, etc.) some relevant output of search_and_label_image_sequence_with_sdk_p, end such data to an endpoint (e.g., that may be specified by a parameter such as SYM_CORE_ENDPOINT_INFO) and notify (e.g., using a REST API call, email or some other mechanism at a customer at a core computing site 102). Such data may include one or more images and other information. Such other information may include semantically identified (possibly with some probabilities of correctness) labeled file(s) about the discovered objects of interest (e.g., specified using an objects parameter using an earlier search_and_label_image_sequence_with_sdk_p command). Such an analysis may be made based on one image, a sequence of images, a video, etc. If no candidate objects are identified, some indication (e.g., such as an empty file) may be used by a search_and_label_image_sequence_with_sdk_p program to avoid sending and notifying a customer at a core computing site 102.

Such coupling of data between successive commands in a template file may be used as distinct instances of the pipeline node element templates 410 for distinct SDKs, DPUs, etc. One or more such distinct pipeline node element templates 410 may be identified (e.g., using a name or some other identifier) and specified as a selected node in a workflow pipeline template 406. Similarly, a collection of one or more distinct workflow pipeline templates 406 may be created to assemble different services for various configurations (such as different DPUs, different SDKs, different edge devices, different customer endpoint needs, etc.).

Figure 15:
FIG. 15 shows an example of a labeled file that may be output by a configurable workflow pipeline in an illustrative embodiment.

An example of what a labeled file may contain is shown in FIG. 15. A labeled file (e.g., such as the file 1500 shown in FIG. 15) may be empty (e.g., no objects found) or may contain a list of one or more identified objects based on a list of objects of interest (e.g., SYM_LIST_OF_OBJECTS_OF_INTEREST as shown in the example of FIG. 14E). Information associated with a candidate identified object may include various (e.g., estimated, computed, observed, etc.) characteristics (e.g., location coordinates, orientation, color, speed, acceleration, occlusion, dimensions, truncations, etc.). Variants of contents of such an object file (e.g., the file 1500 shown in FIG. 15) and other information (e.g., about an observing edge device location, name, etc.) may also be supplied to a customer (e.g., at a core computing site 102) using various communication mechanisms (e.g., API calls, emails, etc.).

A record (e.g., a line in a labeled file such as the example file 1500 shown in FIG. 15) may specify an <object> (e.g., from a list of expressed object list of interest shown in FIG. 14E), and/or other detected objects. For example, an <object> may be a "car," and various information may be associated with that car <object> record, denoted <supplementary information associated with that object> which may include (e.g., in some format such as a comma-separated format) dimensions, location, orientation, occlusion, color, etc. Other objects of interest (e.g., a person) may be queried (e.g., as shown in FIG. 14E) and/or reported (e.g., as exemplified in FIG. 15). Some models (e.g., specified as models in FIG. 14E) and/or SDKs (e.g., specified as part of the command line search_and_label_image_sequence_with_sdk_p example in FIG. 14E) and DPUs (e.g., specified as dpu_index in FIG. 14E) may be more suitable (e.g., trained, relatively faster, etc.) combinations than single combinations. It should be appreciated that the contents of a labeled file may be in many different forms and formats, and that FIG. 15 is provided as a non-limiting illustrative example. Graphical representations of some contents of a labeled file may include objects that are visually identified (e.g., such as with bounding boxes, edges, colors, etc.). It should be appreciated that many combinations may be specified in various formats. It should further be appreciated that the pseudocode syntax used in the figures are merely representative descriptive examples, and that many other languages, formats, syntax, etc. may be used in other embodiments.

Referring to FIGS. 5B, 8 and 9, an element node in a customized configurable executable workflow pipeline 414 may also transform its input data (e.g., which may include a labeled file, database entries, etc.) to any format desired at an endpoint 505. Input data may be in various forms, such as structured formatted data from a database or other formats. Transformation pipeline node element templates 410 may be customized and parameterized using an associated element property (e.g., an SQL command) to send (e.g., insert a record into a database table) at an endpoint 505. A SYM_CORE_ENDPOINT_I_INFO parameter value may be associated with a data subscriber 305 and endpoint 505 and may include addresses (e.g., IP addresses, ports, URLs, database credentials, and other needed information). Such information may also be hard-coded. Such data transfers may also use data record replication tools to replicate information in full and sharded tables to an endpoint 505 (e.g., using customized parameters specified in one or more pipeline node element property templates 412). Thus, with the pipeline node elements 440 a configurable workflow pipeline 404 can implement any capability that may be expressed as a command line interface and using explicit, implicit and/or parameterized values.

It should be appreciated that variations of example data syntax described herein, as well as various other form combinations and parameterizations, may be used. It should further be appreciated that such a scheme may be implemented using various facilities such as macros, graphical programming languages, object-oriented paradigms and languages, etc. The illustrative examples described herein are considered inclusive of any and all of such implementation possibilities. Such choice of implementations may be based on familiarities of programmers with various languages and technologies, for example. The illustrative examples herein make use of parameters and simple templates for relatively broad and simpler demonstrations of the underlying concepts and principals rather than recommending a particular mechanism.

Figure 16:
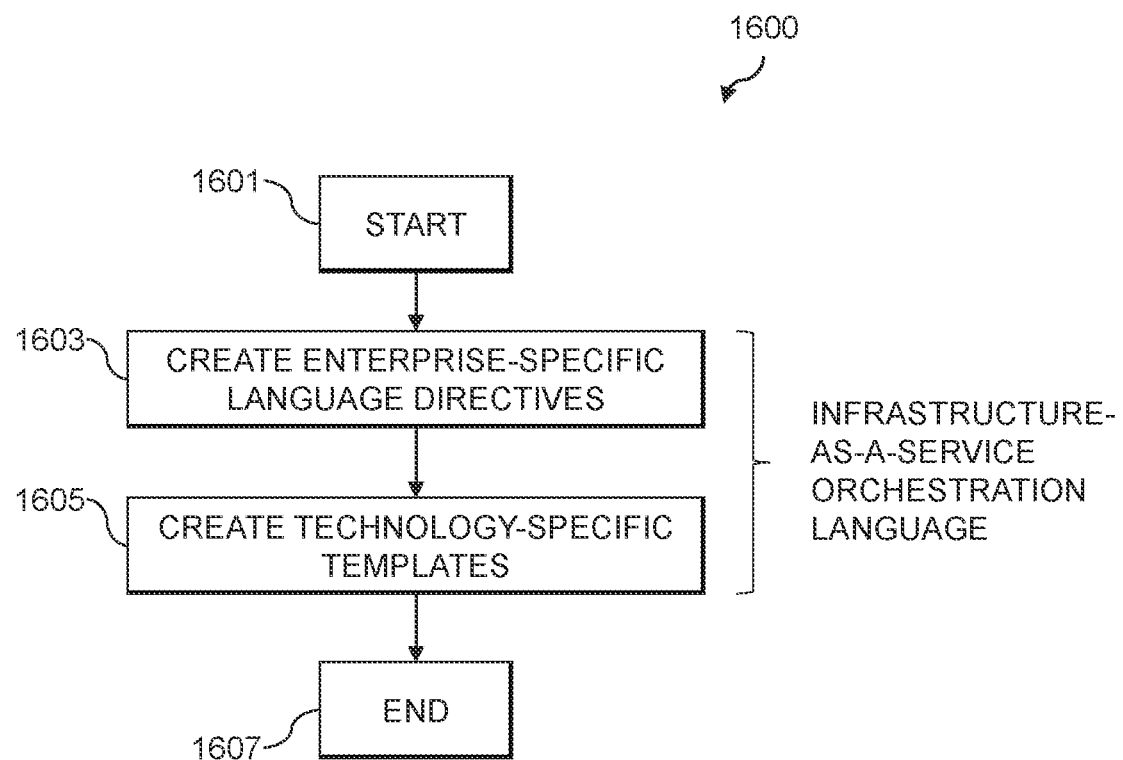
FIG. 16 shows a process flow for design and preparation of a data infrastructure language used for creation of workflow pipelines in an illustrative embodiment.

FIG. 16 shows a process flow 1600 for initial design and preparation for a DIL. The process flow 1600 starts in step 1601, and in step 1603 enterprise-specific language directives are created (e.g., as shown in the pseudocode shown in FIGS. 14A-14E). In step 1605, technology-specific templates are created. Steps 1603 and 1605 collectively create an IaaS orchestration language (e.g., a DTL). The process flow 1600 then ends in step 1607. There can be many such templates (e.g., pipeline node elements templates 410, pipeline node element property templates 412, etc.) of various sizes and various combinations of pipeline node elements 440 (e.g., including various combinations of the node element types shown and described above with respect to FIGS. 5A-5D).

Figure 17:
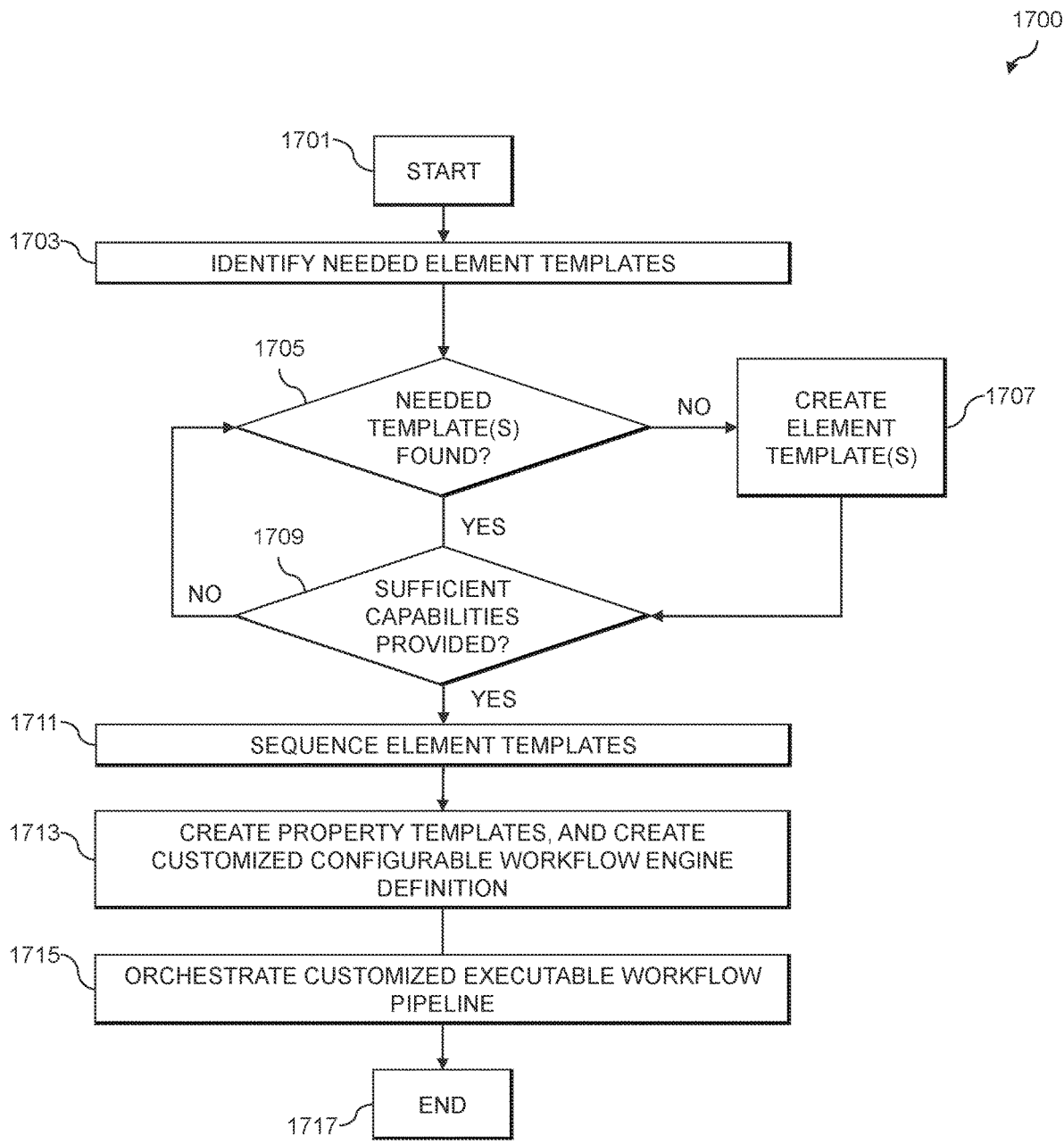
FIG. 17 shows a process flow for designing and configuring workflow pipelines using a data infrastructure language in an illustrative embodiment.

FIG. 17 shows a process flow 1700 for designing and configuring a workflow pipeline. In some embodiments, the process flow 1700 may be implemented through or using graphical design through a graphical user interface (GUI), such as through graphic design and compilation incorporated into orchestration engines in different data centers (e.g., including edge data centers, cloud environments, etc.). In some embodiments, a first one of the pipeline node element template 410 may represent an object class, and a corresponding pipeline node element property template 412 may represent a software object instance. A second one of the pipeline node element templates 410 may have a similar function as the first pipeline node element template 410, and may be realized as a child of the first pipeline node element template 410 in an object-oriented programming formulation and implementation. In other embodiments, one or more of the pipeline node element templates 410 may represent one or more program commands using a CLI. The run-times of the underlying invoked DPU or GPU transformation, replication and data transfer engines are not shown for clarity of illustration.

The process flow 1700 starts in step 1701. In step 1703, one or more element templates (e.g., pipeline node element templates 410) are identified (e.g., if already pre-designed and available), or may be constructed based on the needs of a particular data subscriber 305. Examples of such pipeline node element templates 410 are shown in FIGS. 14C and 14E described above, for the needs of a data subscriber 305 and endpoint 505. Further, the output of one of the pipeline node element templates 410 (e.g., shown in FIG. 14C) may be used as input for a subsequent one of the pipeline node element templates 410 (e.g., shown in FIG. 14E).

In step 1705, a determination is made as to whether any applicable element templates exist (e.g., whether needed ones of the pipeline node element templates 410 exist). If the result of the step 1705 determination is no, then such element templates are created in step 1707. Step 1707 may include adapting one or more existing element templates (e.g., existing ones of the pipeline node element templates 410) to create other pipeline node element templates 410 with some different function(s). As such adaptations and adjustments are made, pipeline node element template 410 capabilities may be extended. The pipeline node element templates 410 may be configured using one or more of the pipeline node element property templates 412 as described elsewhere herein. Thus, some embodiments can provide extendible and configurable systems. The pipeline node element templates 410 may be characterized as an IaaS language specification, where corresponding IaaS parameter values may be specified using pipeline node element property templates 412, or in some other fashion.

Examples of pipeline node element templates 410 are shown in FIGS. 14C and 14E. If suitable existing pipeline node element templates 410 are found in step 1705 (e.g., possibly after creation of any needed element templates in step 1707), the process flow 1700 proceeds to step 1709. In step 1709, the requirements of a data subscriber or endpoint are considered to determine whether additional capabilities are needed. If more capabilities are needed, the process flow 1700 can return to step 1705. The process flow 1700 may alternatively return to step 1703, if preferred. Otherwise, the process flow 1700 proceeds to step 1711 to establish a logical processing of the pipeline node element templates 410. Examples of pipeline node element property templates 412 are shown in FIGS. 14B, 14D and 14F. In step 1711, the pipeline node element property templates 412 can be populated, and a sequenced workflow pipeline template 406 is created. Sequencing of the pipeline node element templates 410 and associated pipeline node element property templates 412 may be defined using file names, and arranged or identified (e.g., named) sequence of various pipeline node element templates 410, or any other desired mechanism. For example, a pipeline node element template 410 instance may be named "m.e" and a corresponding pipeline node element property template 412 instance may be named "m.p" where m may be an integer. Another pipeline node element template 410 may be named "n.e" and a corresponding pipeline node element property template 412 may be named "n.p." In this example m and n may be different integers. A sequence of pipeline node element templates 410 may be formed using various techniques such as using definition files, graphs, numerical ordering of names, etc. to form a workflow pipeline template 406. A workflow pipeline template 406 may include one or more pipeline node element templates 410, and can be created at the end of step 1707.

The process flow 1700 then proceeds to step 1713, where the workflow pipeline template 406 created in step 1707, along with all of the associated corresponding pipeline node element templates 410 and values of the pipeline node element property templates 412 are used to define a configurable workflow pipeline 404 as one of the customized configurable executable workflow pipelines 414. The process then moves to step 1715, where an edge data orchestration engine 335 can use the information in a customized configurable workflow pipeline 404 (e.g., the customized configurable executable workflow pipeline 414 created in step 1713) to orchestrate the customized configurable executable workflow pipeline 414. For the examples of FIGS. 14A-14F, the edge data orchestration engine 335 may substitute symbols with values, form one or more scripts, and arrange for execution of the customized configurable executable workflow pipeline 414, possibly based on a schedule that may be defined (e.g., as described above with respect to FIGS. 14A and 14B). Executable commands in the pipeline node element templates 410 may be identified in various ways, such as using comments and predefined reserved labels (e.g., ingest, transform, DPU, data store as illustrated in FIGS. 5A-5D). "Action" is used in the examples of FIGS. 14C and 14E to serve as a generic processing label, and may be replaced with more descriptive (but functionally equivalent) keywords (e.g., action_ingest, action_transform, action_data store, etc.). In some cases, a command may be null and used for readability and documentation purposes. Such reserved keywords may be convenient. In essence, the edge data orchestration engine 335 may arrange for an ordered execution of such "actions" using the variables in the pipeline node element templates 410 and associated pipeline node element property templates 412 in the form of customized configurable workflows 404 (e.g., the customized configurable executable workflow pipelines 414). The execution of the customized configurable executable workflow pipelines 414 may be governed by values in a scheduled, which may be derived from a "schedule" reserved keyword. An example schedule is shown in FIGS. 14A and 14B. A schedule may take one or more forms, such as based on triggers, predefined times, manual executions, etc. After step 1715, the process flow 1700 ends at step 1717.

FIG. 14A shows one example of a schedule, but it should be appreciated that embodiments are not limited to this specific example and does not limit the intended capability for invocations of the customized configurable executable workflow pipelines 414. It should be noted that an "action" can be any executable command, including but not limited to a database command, a data transformation command, a file manipulation command, a directory manipulation command, an edge device command, a command to another device, etc. Therefore, the customized configurable executable workflow pipelines 414 are flexible to address a variety of requirements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for edge data processing utilizing per-endpoint subscriber configurable data processing workflows will now be described in greater detail with reference to FIGS. 18 and 19. Although described in the context of system 100, these platforms may also be used to implement at least portions of other information processing systems in other embodiments.

Figure 18:
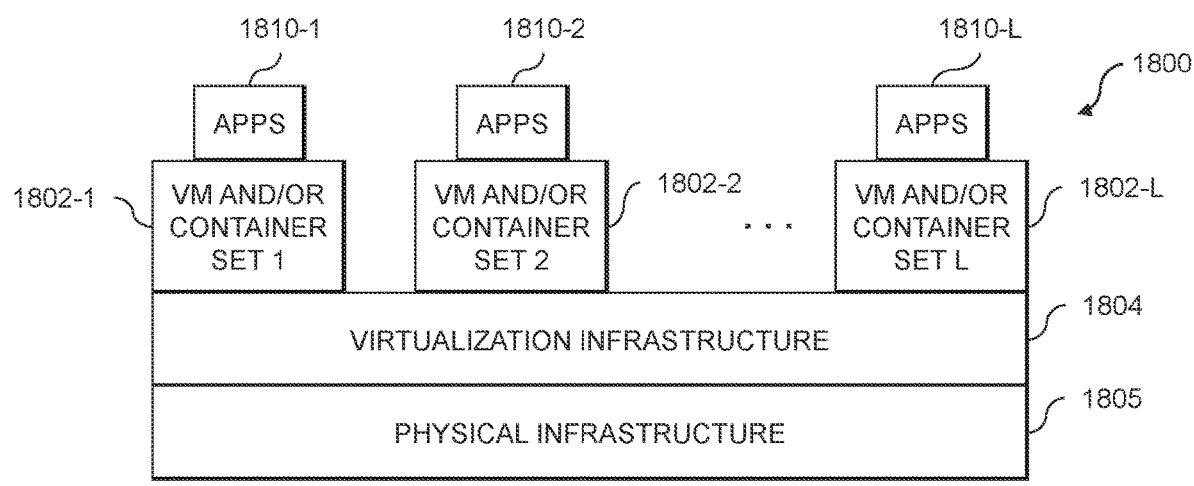
FIGS. 18 and 19 show examples of processing platforms that may be utilized to implement at least a portion of an information processing system in illustrative embodiments.
Figure 19:
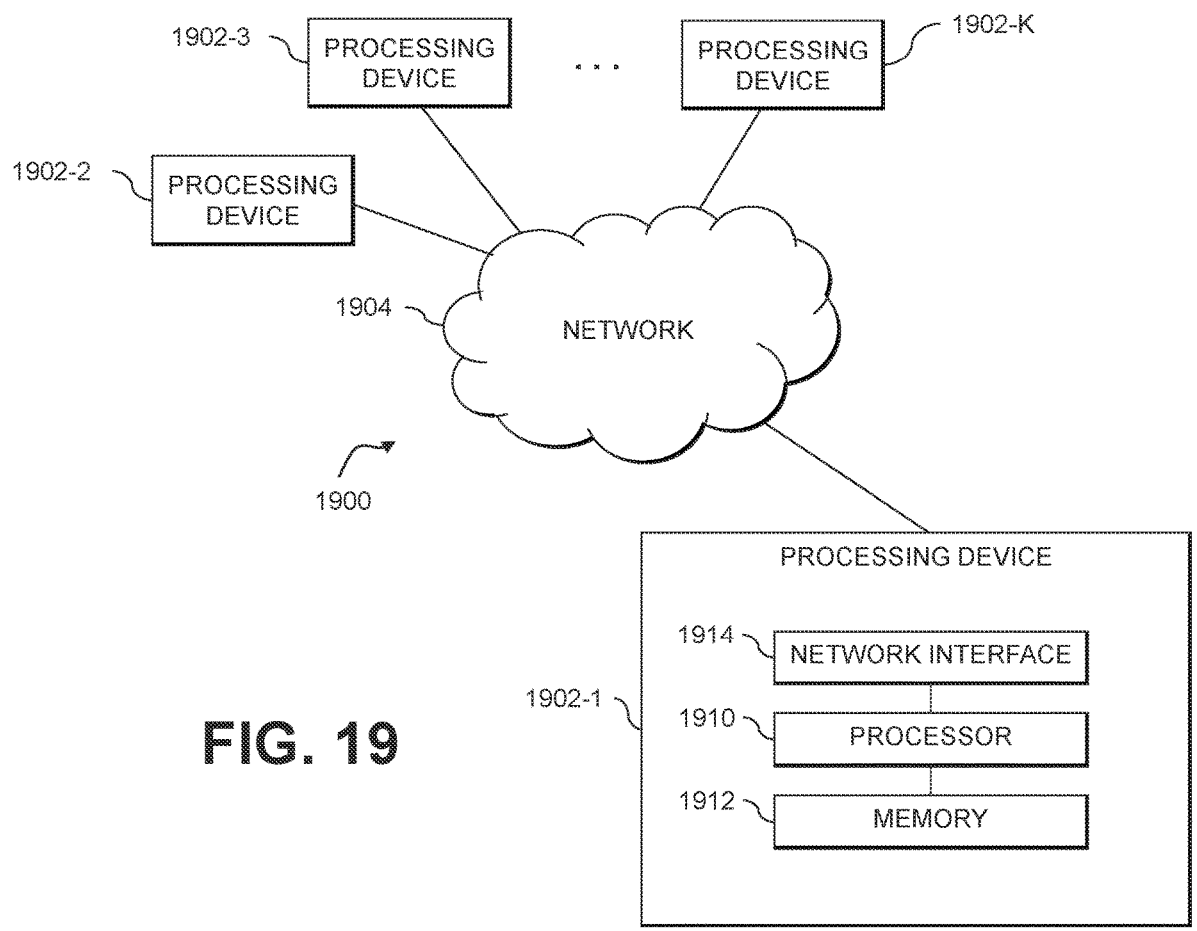

FIG. 18 shows an example processing platform comprising cloud infrastructure 1800. The cloud infrastructure 1800 comprises a combination of physical and virtual processing resources that may be utilized to implement at least a portion of the information processing system 100 in FIG. 1. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912.

The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform. For example, an apparatus or appliance may include one or more edge devices (e.g., edge devices 106) that are integrated (e.g., loosely or tightly) with edge computing sites (e.g., edge computing sites 104) and/or various elements of the FIGS. 18 and 19 systems, etc., in order to form a custom intelligent application that can be stationary and/or mobile.

As indicated previously, components of an information processing system as disclosed herein can be implemented at least in part in the form of one or more software programs stored in memory and executed by a processor of a processing device. For example, at least portions of the functionality for edge data processing utilizing per-endpoint subscriber configurable data processing workflows as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      obtaining, at a data center, source data generated by one or more edge devices associated with the data center;
      generating a per-endpoint data processing workflow for each of one or more endpoint subscribers of the source data generated by the one or more edge devices associated with the data center, a given per-endpoint data processing workflow associated with a given one of the one or more endpoint subscribers specifying one or more authorization parameters and one or more transformation parameters, the one or more transformation parameters specifying at least portions of an execution graph comprising a sequence of data transformation processes including one or more data transformation processes to be applied at least one of before and after processing of the source data generated by the one or more edge devices associated with the data center using one or more hardware accelerators of the data center;
      selecting, based at least in part on the one or more authorization parameters in the given per-endpoint data processing workflow, at least a portion of the source data generated by the one or more edge devices associated with the data center that is to be provided to the given endpoint subscriber;
      applying, based at least in part on the one or more transformation parameters in the given per-endpoint data processing workflow, one or more data transformations to the portion of the source data generated by the one or more edge devices associated with the data center that is to be provided to the given endpoint subscriber to generate transformed data for the given endpoint subscriber; and
      providing, from the data center to the given endpoint subscriber, the transformed data.

2. The apparatus of claim 1 wherein the given endpoint subscriber comprises one or more other edge devices associated with the data center.

3. The apparatus of claim 1 wherein the data center comprises an edge data center, and wherein the given endpoint subscriber comprises a core data center coupled to the edge data center.

4. The apparatus of claim 3 wherein the edge data center is operated by a first entity, and wherein the core data center coupled to the edge data center is operated by a second entity different than the first entity.

5. The apparatus of claim 1 wherein the given per-endpoint data processing workflow comprises one or more data files written in a data infrastructure language of an entity operating the data center.

6. The apparatus of claim 1 wherein the given per-endpoint data processing workflow comprises a configurable workflow pipeline defining:
   one or more scheduling parameters specifying a schedule for providing the portion of the source data generated by the one or more edge devices associated with the data center to the given endpoint subscriber;
   one or more acquisition parameters for obtaining the portion of the source data generated by the one or more edge devices associated with the data center;
   the one or more authorization parameters;
   the one or more transformation parameters; and
   one or more data transfer parameters specifying destination address information and access credentials for the given endpoint subscriber.

7. The apparatus of claim 6 wherein the given per-endpoint data processing workflow comprises an instantiation of one or more configurable workflow templates, a given one of the configurable workflow templates specifying:
   one or more commands for creating storage space and access rights for the given endpoint subscriber to access the transformed data; and
   the configurable workflow pipeline.

8. The apparatus of claim 1 wherein the one or more authorization parameters specify, for each of one or more data elements in the source data generated by the one or more edge devices associated with the data center, one or more types of information permitted to be shared with the given endpoint subscriber.

9. The apparatus of claim 1 wherein the one or more transformation parameters specify one or more types of data processing to be applied to the portion of the source data generated by the one or more edge devices associated with the data center using the one or more hardware accelerators of the data center.

10. The apparatus of claim 1 wherein the one or more hardware accelerators of the data center comprise one or more graphics processing units.

11. The apparatus of claim 1 wherein the one or more transformation parameters specify one or more security measures to be applied to the portion of the source data generated by the one or more edge devices associated with the data center at least one of before and after processing of the source data generated by the one or more edge devices associated with the data center using the one or more hardware accelerators of the data center.

12. The apparatus of claim 11 wherein the one or more security measures comprise at least one of encryption, compression and aggregation.

13. The apparatus of claim 1 wherein a first one of the one or more endpoint subscribers and a second one of the one or more endpoint subscribers are associated with a same entity, the first endpoint subscriber having a first per-endpoint data processing workflow and the second endpoint subscriber having a second per-endpoint data processing workflow different than the first per-endpoint data processing workflow.

14. The apparatus of claim 1 wherein generating the given per-endpoint data processing workflow for the given endpoint subscriber comprises generating a configurable workflow pipeline using a subset of a plurality of pipeline processing elements, the plurality of pipeline processing elements comprising one or more device data ingestion elements, one or more transformation elements, one or more data processing unit elements, and one or more data store elements.

15. A computer program product comprising a non-transitory processor-readable storage medium having stored therein program code of one or more software programs, wherein the program code when executed by at least one processing device causes the at least one processing device to perform steps of:
   obtaining, at a data center, source data generated by one or more edge devices associated with the data center;
   generating a per-endpoint data processing workflow for each of one or more endpoint subscribers of the source data generated by the one or more edge devices associated with the data center, a given per-endpoint data processing workflow associated with a given one of the one or more endpoint subscribers specifying one or more authorization parameters and one or more transformation parameters, the one or more transformation parameters specifying at least portions of an execution graph comprising a sequence of data transformation processes including one or more data transformation processes to be applied at least one of before and after processing of the source data generated by the one or more edge devices associated with the data center using one or more hardware accelerators of the data center;
   selecting, based at least in part on the one or more authorization parameters in the given per-endpoint data processing workflow, at least a portion of the source data generated by the one or more edge devices associated with the data center that is to be provided to the given endpoint subscriber;
   applying, based at least in part on the one or more transformation parameters in the given per-endpoint data processing workflow, one or more data transformations to the portion of the source data generated by the one or more edge devices associated with the data center that is to be provided to the given endpoint subscriber to generate transformed data for the given endpoint subscriber; and
   providing, from the data center to the given endpoint subscriber, the transformed data.

16. The computer program product of claim 15 wherein the given per-endpoint data processing workflow comprises a configurable workflow pipeline defining:
   one or more scheduling parameters specifying a schedule for providing the portion of the source data generated by the one or more edge devices associated with the data center to the given endpoint subscriber;
   one or more acquisition parameters for obtaining the portion of the source data generated by the one or more edge devices associated with the data center;
   the one or more authorization parameters;
   the one or more transformation parameters; and
   one or more data transfer parameters specifying destination address information and access credentials for the given endpoint subscriber.

17. The computer program product of claim 16 wherein the given per-endpoint data processing workflow comprises an instantiation of one or more configurable workflow templates, a given one of the configurable workflow templates specifying:
    one or more commands for creating storage space and access rights for the given endpoint subscriber to access the transformed data; and
    the configurable workflow pipeline.

18. A method comprising:
    obtaining, at a data center, source data generated by one or more edge devices associated with the data center;
    generating a per-endpoint data processing workflow for each of one or more endpoint subscribers of the source data generated by the one or more edge devices associated with the data center, a given per-endpoint data processing workflow associated with a given one of the one or more endpoint subscribers specifying one or more authorization parameters and one or more transformation parameters, the one or more transformation parameters specifying at least portions of an execution graph comprising a sequence of data transformation processes including one or more data transformation processes to be applied at least one of before and after processing of the source data generated by the one or more edge devices associated with the data center using one or more hardware accelerators of the data center;
    selecting, based at least in part on the one or more authorization parameters in the given per-endpoint data processing workflow, at least a portion of the source data generated by the one or more edge devices associated with the data center that is to be provided to the given endpoint subscriber;
    applying, based at least in part on the one or more transformation parameters in the given per-endpoint data processing workflow, one or more data transformations to the portion of the source data generated by the one or more edge devices associated with the data center that is to be provided to the given endpoint subscriber to generate transformed data for the given endpoint subscriber; and
    providing, from the data center to the given endpoint subscriber, the transformed data;
    wherein the method is performed by at least one processing device comprising a processor coupled to a memory.

19. The method of claim 18 wherein the given per-endpoint data processing workflow comprises a configurable workflow pipeline defining:
    one or more scheduling parameters specifying a schedule for providing the portion of the source data generated by the one or more edge devices associated with the data center to the given endpoint subscriber;
    one or more acquisition parameters for obtaining the portion of the source data generated by the one or more edge devices associated with the data center;
    the one or more authorization parameters;
    the one or more transformation parameters; and
    one or more data transfer parameters specifying destination address information and access credentials for the given endpoint subscriber.

20. The method of claim 19 wherein the given per-endpoint data processing workflow comprises an instantiation of one or more configurable workflow templates, a given one of the configurable workflow templates specifying:
    one or more commands for creating storage space and access rights for the given endpoint subscriber to access the transformed data; and
    the configurable workflow pipeline.

* * * * *